United States Patent
Singhal et al.

(10) Patent No.: US 8,815,279 B2
(45) Date of Patent: *Aug. 26, 2014

(54) BABY FEEDING FORMULA AND SYSTEM

(75) Inventors: Atul Singhal, Waterford (GB); Alan Lucas, Cambridge (GB)

(73) Assignee: University College London, London (GB)

( * ) Notice: Subject to any disclaimer, the term of this patent is extended or adjusted under 35 U.S.C. 154(b) by 251 days.

This patent is subject to a terminal disclaimer.

(21) Appl. No.: 12/318,678

(22) Filed: Jan. 6, 2009

(65) Prior Publication Data

US 2009/0175979 A1    Jul. 9, 2009

Related U.S. Application Data

(60) Continuation-in-part of application No. 11/822,078, filed on Jul. 2, 2007, now Pat. No. 7,998,501, which is a division of application No. 10/806,169, filed on Mar. 23, 2004, now abandoned, which is a continuation-in-part of application No. PCT/GB2004/000518, filed on Feb. 9, 2004.

(30) Foreign Application Priority Data

| Feb. 10, 2003 | (GB) | .................................. 0302929.5 |
| Feb. 27, 2003 | (GB) | .................................. 0304482.3 |
| Aug. 5, 2003 | (GB) | .................................. 0318270.6 |

(51) Int. Cl.
  *A61K 47/00*   (2006.01)
  *A23L 1/29*    (2006.01)
  *A23L 1/305*   (2006.01)
  *A23L 1/302*   (2006.01)
  *A23L 1/304*   (2006.01)

(52) U.S. Cl.
  CPC ............. *A23L 1/296* (2013.01); *A23L 1/305* (2013.01); *A23L 1/302* (2013.01); *A23L 1/304* (2013.01); *Y10S 426/801* (2013.01)
  USPC ........................................... 424/439; 426/801

(58) Field of Classification Search
  None
  See application file for complete search history.

(56) References Cited

U.S. PATENT DOCUMENTS

| 1,607,844 A | 11/1926 | Nielsen |
| 3,649,295 A | 3/1972  | Bernhart |

(Continued)

FOREIGN PATENT DOCUMENTS

| FR | 911522 A    | 7/1946 |
| JP | 2003018980 A | 1/2003 |

(Continued)

OTHER PUBLICATIONS

US Department of Health and Human Services, Who is at risk of Atherosclerosis? accessed online May 4, 2010.*

(Continued)

*Primary Examiner* — Anand Desai
*Assistant Examiner* — Melissa Mercier

(57) ABSTRACT

A method is provided for reducing the extent of or occurrence of long-term adverse health effects in human infants, comprising feeding to said infants when newborn a nutrient-containing-formula providing not more than 1 gram of protein per 100 ml of formula and/or not more than 50 kcal per 100 ml of formula. Also disclosed are methods of administering the infant formulas to reduce the occurrence or extent of insulin resistance in an individual later in life, to reduce the occurrence or extent of obesity or atherosclerosis in an individual later in life, or combinations thereof, by feeding newborn infants the newborn infant formula described herein.

13 Claims, 2 Drawing Sheets

Weight in girls given standard formula versus lower nutrient starter formula.

(56) References Cited

U.S. PATENT DOCUMENTS

| | | | |
|---|---|---|---|
| 4,216,236 | A | 8/1980 | Mueller et al. |
| 5,021,245 | A | 6/1991 | Borschel et al. |
| 5,093,143 | A | 3/1992 | Behr et al. |
| 5,492,899 | A * | 2/1996 | Masor et al. ............... 514/47 |
| 5,550,106 | A | 8/1996 | Petschow et al. |
| 5,602,109 | A * | 2/1997 | Masor et al. ............... 514/45 |
| 5,756,680 | A | 5/1998 | Ahmed et al. |
| 6,096,870 | A | 8/2000 | Mozaffar et al. |
| 7,998,501 | B2 | 8/2011 | Singhal et al. |
| 2002/0004527 | A1 | 1/2002 | Auestad et al. |
| 2003/0026860 | A1 | 2/2003 | Lasekan et al. |
| 2004/0101596 | A1 | 5/2004 | Ndife et al. |
| 2004/0214791 | A1 | 10/2004 | Auestad et al. |
| 2007/0254062 | A1 | 11/2007 | Singhal et al. |
| 2011/0262585 | A1 | 10/2011 | Singhal |

FOREIGN PATENT DOCUMENTS

| | | |
|---|---|---|
| JP | 2004341155 A | 12/2004 |
| WO | 9518618 A2 | 7/1995 |
| WO | 0150889 A1 | 7/2001 |
| WO | 03077664 A1 | 9/2003 |
| WO | 2004068968 A1 | 8/2004 |
| WO | 2006069918 A1 | 7/2006 |
| WO | 2007004878 A2 | 1/2007 |
| WO | 2008071667 A1 | 6/2008 |

OTHER PUBLICATIONS

Boyles, Salynn, Breastfeeding and later obesity, WebMD Health news, Apr. 24, 2007.*
Demmelmair, et al, "Long-term consequences of early nutrition," Early Human Development, vol. 82, No. 8, pp. 567-574 (Aug. 1, 2006).
Fomon, et al., "What is the safe protein-energy ratio for infant formulas?," Am. J. Clin. Nutr., vol. 62, No. 2, pp. 358-363 (Jan. 1, 1995).
International Search Report and Written Opinion for PCT/IB2009/055832 mailed Nov. 8, 2010.
Final Office Action issued in U.S. Appl. No. 11/822,078 mailed Dec. 22, 2010.
C.F. Whitten, R.A. Steward, The Effect of Dietary Socium in Infancy on Blood Pressure and Related Factors, Acta Pediatr Scand 1980; 279: 1-17.
S. Kolacek, T. Kapetanovic, k Zimola, V. Luzar, Early Determinants of Cardiovascular Risk Factors in Adults. A. Plasma Lipids, Acta. Paediatr. 1993; 82: 699-704.
M.P. Stern, Do Non-Insulin-Dependent Diabetes Mellitus and Cardiovascular Disease Share Common Antecedents?, Am. Intern. Med 1996; 124: 110-16.
T. Forsen, J. Eriksson, J. Tuomilehto, A. Reunanen, C. Osmond, D. Barker, The Fetal and Childhood Growth of Persons Who Develop Type 2 Diabetes, Am. Intern. Med 2000; 133: 176-82.
S.M. Grundy, Hypertriglyceridemia, Atherogenic Dyslipidemia, and the Metabolic Syndrome, Am. J. Cardiol. 1998; 81: 18B-25B.
A.C.J. Ravelli, J. HP. Van Der Meulen, C. Osmond, D.J.P. Barker, O.P. Bleker, Obesity at the Age of 50 Y in Men and Women Exposed to Famine Prenatally 1-3, Am. J. Clin. Nutr. 1999; 70: 811-6.
Singhal, Atul, Early Nutrition & Leptin Concentrations in Later Life, American Soc for Clinical Nutrition 2002:75993-9.
A. Lucas, S.M. Gore, T.J. Cole, et al, Multicentre Trial on Feeding of Low Birthweight Infants: Effedts of Diet on Early Growth, Arch Dis Child 1984; 59: 722-30.
A. Lucas, R. Morley, G.J. Hudson, M.F. Bamford, A. Boon, P.Crowle, J.F.B Dossetor, R. Pearse, Early Sodium Intake and Later Blood Pressure in Preterm Infants, Arch Dis Child 1988; 63: 656-57.
J.V. Freeman, T.J. Cole, S. Chinn, P.R.M. Jones, E.M. White, M.A. Preece, Cross Sectional Stature and Weight Reference Curves for the UK, 1990, Arch Dis Child 1990; 73: 17-24.
P.H. Whincup, D.G. Cook, O. Papacosta, Do Maternal and Intrauterine Factors Influence Blood Pressure in Childhood, Arch Dis Child 1992; 67: 1423-29.
M. Barker, S. Robinson, C. Osmond, D.J.P. Barker, Birth Weight and Body Fat Distribution in Adolescent Girls, Arch Dis Child 1997; 77: 381-3.
N. Modi, Hyponatraemia in the Newborn, Arch Dis Child Fetal Neonatal 1998; 78: F81-84.
N.R. Cook, J. Cohen, P.R. Herbert, J.O. Taylor, C.H. Hennekens, Implications of Small Reductions in Diastolic Blood Pressure for Primary Prevention, Arch Intern Med 1995; 155: 701-09.
M.K. Ounsted, J.M. Cockburn, V.A. Moar, C.W.G. Redman, Factors Associated With the Blood.Pressure of Children Born to Women Who Were Hypertensive During Pregnancy Arch. Dis. Child 1985; 60: 631-35.
A.C.J. Ravelli, J.H.P. Van Der Meulen, C. Osmond, D.J.P. Barker, O.P. Bleker, Infant Feeding and.Adult Glucose Tolerance, Lipid Profile, Blood Pressure, and Obesity, Arch. Dis. Child 2000; 82: 248-52.
D.P. Davies, R.M. Martin, A. McCarthy, G.D Smith, Y. Ben-Shlomo, Association Between Infant Nutrition and Blood Pressure in Ealry Adulthood: The Barry Caerphilly Growth Cohort Study, Arch. Dis. Child 2003; 88: A2-3 (ABSTR).
S. Cianfarani, D. Germani, F. Branca, Low Birthweight and Adult Insulin Resistance: The 'Catch-Up Growth' Hypothesis, Arch. Dis. Child Fetal Neonatal Ed 1999; 81: F71-73.
C.M. Law, Significance of Birth Weight for the Future, Arch. Dis. Child. Fetal Neonatal 2002; 86: F7-8.
D.S. Lewis, G.E. Mott, C.A. McMahan, E.J. Masoro, K.D. Carey, H.C. McGill, Deferred Effects of Preweaning Diet on Atherosclerosis in Adolescent Baboons, Atherosclerosis 1988; 8: 274-80.
E. Bergstrom, O. Hernell, L.A. Persson, B. Vessby, Serum Lipid Values in Adolescents Are Related to Family History, Infant Feeding, and Physical Growth, Atherosclerosis 1995; 117: 1-13.
J. Proietto, A.W. Thorburn, Animal Models of Obesity-Theories of Aetiology, Baillieres Clin. Endocrinol Metab 1994; 8: 509-25.
K.K. Ong, D.B. Dunger, Perinatal Growth Failure: The Road to Obesity, Insulin Resistyance and Cardiovascular Disease in Adults, Best Prac. Res. Clin. Epidemiol. Metab. 2002; 16: 191-207 Perinatal Growth.
C.N. Hales, M. Desai, S.E. Ozanne, N.J. Crowther, Fishing in the Stream of Diabetes: From Measuring Insulin to the Control of Fetal Organogenesis , Biochem. Soc Trans 1996; 24: 341-350.
R.P. Garofalo, A.S. Goldman, Cytokines, Chemokines, and Colony-Stimulating Factors in Human Milk: The 1997 Update, Biol Neonate 1998; 74: 134-42.
D.M. Czajka-Narins, J. Hirsch, Supplementary Feeding During the Preweaning Period. eFFECT on Carcass Composition and Adipose Tissue Cellularity of the Rat, Biol. Neonate. 1974; 25: 176-185.
Y.A. Anwar, B.E. Tendler, E.J. Mccabe, G.A. Mansoor, W.B. White, Evaluation of the Datascope Accutorr Plus According Tyo the Recommendations of the Association for the Advancement of Medical Instrumentation, Blood Press Monit 1997; 2: 105-10.
D.J.P. Barker, C.Osmond, J Golding, D. Kuh, M.E.J. Wadsworth, Growth in Uter, Blood Pressure in Childhood and Adult Life, and Mortality From Cardiovascular Disease, BMJ 1989; 298: 564-67.
P.H. Whincup, D.G. Cook, A.G. Shaper, Early Influences on Blood Pressure: A Study of Children Aged 5-7 Years, BMJ 1989; 299: 587-91.
D.S. Seidam, A. Laor, R. Gale, D.K. Stevenson, S. Mashiach, Y.L. Danon, Birth Weight, Current Body Weight, and Blood Pressure in Late Adolescence, BMJ 1991; 302: 1235-37.
C.N. Hales, D.J.P. Barker, P.M.S. Clark, L.J. Cox, C. Fall, C. Osmond, P.D. Winter, Fetal and Infant Growth and Impaired Glucose Tolerance at Age 64, BMJ 1991; 303: 1019-22.
C.H.D. Fall, D.J.P. Barker, C.Osmmond, P.D. Winter, P.M.S. Clark, C.N. Hales, Relation of Infant Feeding to Adult Serum Cholesterol Concentration and Death From Ischaemic Heart Disease, BMJ 1992; 304: 801-05.
C.M. Law, M. DE Swiet, C. Osmond, P.M. Fayers, D.J.P. Barker, A.M. Cruddas, C.H.D. Fall, Initiation of Hypertension in Utero and Its Amplification Throughout Life, BMJ 1993; 306: 24-27.
M.R. Law, N.J. Wald, S.G. Thompson, By How Much and How Quickly Does Reduction in Serum Cholesterol Concentration Lower Risk of Ischaemic Heart Disease?, BMJ 1994; 308: 367-73.
A. Lucas, R. Morley, Does Early Nutrition in Infants Born Before Term Programme Later Blood Pressure?, BMJ 1994; 309: 304-08.

(56) References Cited

OTHER PUBLICATIONS

C.H.D. Fall, C. Osmond, D.J.P. Barker, P.M.S. Clark, C.N. Hales, Y. Stirling, T.W. Meade, Fetal and Infant Growth and Cordiovascular Risk Factors in Women, BMJ 1995 310; 428-32.

P. Whincup, D. Cook, O. Papcosta, M. Walker, Birth Weight and Blood Pressure: Cross Sectional and Longitudinal Relations in Childhood, BMJ 1995; 311: 773-76.

M.A. Mendall, P. Patel, L. Ballam, D. Strachan, T.C. Northfield, C Reactive Protein and Its Relation to Cardiovascular Risk Factors: A Population Based Cross Sectional Study, BMJ 1996; 312: 1061-65.

H.T. Sorenson, S. Sabroe, K.J. Rothman, M. Gillman, P. Fischer, T.I.A. Sorensen, Relation Between Weight and Length at Birth and Body Mass Index in Young Adulthood: Cohort Study, BMJ 1997; 315: 1137.

A. Laor, D.K. Stevenson, J. Shemer, R. Gale, D.S. Seideman, Size at Birth, Maternal Nutrition Status in Pregnancy, and Blood Pressure at Age 17: Populatioin Based Analysis, BMJ 1997; 315: 449-53.

J.L. Tang, J.M. Armitage, T. Lancaster, C.A. Silagy, G.H. Fowler, H.A.W. Neil, Systemic Review of Dietary Intervention Trials to Lower Blood Cholesterol in Free-Living Subjects, BMJ 1998; 316: 1213-19.

Lucas, A., CIBA Foundation Symposium 156, 38-55 (1991).

Singhal, A., et al., The Lancet 357, 413-419 (Feb. 10, 2001).

Singhal, A., et al, Am. J. Clin. Nutr. 2002: 75, 993-999 (2002).

Singhal, A., et al, The Lancet 363, 1571-1578 (May 15, 2004).

Singhal, A., et al, The Lancet 363, 1642-1645 (May 15, 2004).

Stettler, N., et al, Circulation 2005: 111, 1897-1903.

G-P. Ravelli, Z.A. Stein, M.W. Susser, Obesity in Young Men After Famine Exposire in Utero and Early Infancy, N. Eng. J. Med 1976; 295: 349-53.

E. Charney, H.C. Goodman, M. McBride, L. Barbro, R. Pratt, Childhood Antecedents of Adult Obesity. Do Chubby Infants Become Obese Adults?, N. Eng. J. Med. 1976; 295: 6-9.

W.P. Newman, D.S. Freedman, A.W. Voors, P.D. Gard, S.R. Srinivasan, J.L. Reasanta, G.D. Williamson, L.S. Webber, G.S. Berenson, Relation of Serum Lipoprotein Levels and Systolic Blood Pressure to Erly Atherosclerosis: The Bogalusa Heart Study, N. Engl. J. Med 1986; 314: 138-44.

D.S. Freedman, S.R. Srinivasan, C.L. Shear, F.A. Franklin, L.S. Webber, G.S. Berenson, The Relation of Apolipoprotein A-1 and B in Children to Parental Myocardial Infarction, N. Engl. J. Med 1986; 315: 721-26.

R.V. Considine, M.H. Sinha, M.L. Heiman, A. Kriauciunas, T.W. Stephens, M.R. Nyce, J.P. Ohannesian, C.C. Marco, L.J. McKee, T.L. Bauer, J.F. Caro, Serum Immunoreactive-Leptin Concentrations in Normal-Weight and Obese Humans, N. Engl. J. Med. 1996; 334: 292-5.

F. Lonnqvist, P. Arner, L. Nordfors, M. Schalling, Overexpression of the Obese (OB) Gene in Adipose Tissue of Human Obese Subjects, Nat. Med 1995; 1: 950-3.

B.S. Hamilton, D. Paglia, A.Y.M. Kwan, M. Deitel, Increased Obese mRNA Expression in Omental Fat Cells From Massively Obese Humans, Nat. Med 1995; 1: 953-6.

M. Maffei, J. Hallas, E. Ravussin, R.E. Pratley, G.H. Lee, Y. Zhang, H. Fei, S. Kim, R. Lallone, S. Ranganathan, P.A. Kern, J.M. Friedman, Leptin Levels in Human and Rodent: Measurement of Plasma Leptin and OB RNA in Obese and Weight-Reduced Subjects, Nat. Med. 1995; 11: 1155-61.

E. Ravussin, R.E. Pratley, M. Maffei, H. Wang, J.M. Friedman, P.H. Bennett, C. Bogardus, Relatively Low Plasma Leptin Concentrations Precede Weight Gain in Pima Indians, Nat. Med. 1997; 3: 238-40.

R. Ross, The Pathogenesis of Atherosclerosis: A Perspective for the 1990'S, Nature 1993; 362: 801-809.

P. Libby, Inflammation in Atherosclerosis, Nature 2002; 420: 868-74.

X.F. Huang, S. Lin, R. Zhang, Upregulation of Leptin Receptor mRNA Expression in Obese Mouse Brain, Neuroreport 1997; 8: 1035-8.

H.C. McGill, G.E. Mott, D.S. Lewis, C.A. McMahan, E.M. Jackson, Early Determinants of Adult Metabolic Regulation: Effects of Infant Nutrition on Adult Lipid and Lipoprotein Metabolism, Nutr. Rev. 1996; 54: S31-40.

R.M. Malina, P.T. Katzmarzyk, G. Beunen, Birth Weight and Its Relationship to Size Attained and Relative Fat Distribution at 7 to 12 Years of Age, Obes Res 1996; 4: 385-90.

L. Lissner, C. Karlsson, a.K. Lindroos, L. Sjostrom, B. Carlsson, L. Carlsson, C. Bengtsson, Birth Weight, Adulthood BMI, and Subsequent Weitght Gain in Relation to Leptin Levels in Swedish Women, Obes. Res 1999; 7: 150-4.

K.G. Elliott, C.L. Kjolhede, E. Gournis, K.M. Rasmussen, Duration of Breastfeeding Associated With Obesity During Adolescence, Obes. Res. 1997; 5: 538-41.

P.M. Duke, I.F. Litt, R.T. Gross, Adolescents' Self-Assessment of Sexual Maturation, Paediatrics 1980; 66: 918-20.

D.S. Freedman, S.R. Srinivasan, R.A. Valdez, D.F. Williamson, G.S. Berenson, Secular Increases in Relative Weight and Adiposity Among Children Over Two Decades: The Bogalusa Heart Study, Paediatrics 1997; 99: 420-6.

C.G. Owen, P.H. Whincup, K. Odoki, J.A. Gilg, D.G. Cook, Infant Feeding and Blood Cholesterol: A Study in Adolescents and a Systematic Review, Paediatrics 2002; 110: 597-608.

M.J.J. Finken, M.G. Keijzer-Veen, A.G. Van Montfoort, F.W. Dekker, J.A. Romijn, M. Froelich, E.T.M. Hille, A. Van Der Heijden, J.M. Wit, Early Catch-Up Growth in Weight of Very Preterm Low Birthweight Infants is Associated With Higher Levels of LDL-Cholesterol and APO-B at Age 19, Ped. Res. 2003; 5: 32a.

L. Taittonen, M. Nuutinen, J. Turtinen, M. Uhari, Prenatal and Postnatal Factors in Predicting Later Blood Pressure Among Children; Cardiovascular Risk in Young Finns, Pediatr Res 1996; 40:627-32.

S.J. Fomon, R.R. Rogers, E.E. Ziegler, S.E. Nelson, L.N. Thomas, Indices of Fatness and Serum Cholesterol at Age Eight Years in Relation to Feeding and Growth During Early Infancey, Pediatr. Res. 1984; 18: 1233-38.

A.C.S. Hokken-Koelega, M.A.J. De Ridder, R.J. Lemmen, H. Den Hartog, S.M.P.F. De Nuinck Keizer-Schrama, S.L.S. Drop, Children Born Small for Gestational Age: Do They Catch Up?, Pediatr. Res. 1995; 38: 267-71.

J. Karlberg, K. Albertsson-Wikland, Growth in Full-Term Small-for-Gestational-Age Infants: From Birth to Final Height, Pediatr. Res. 1995; 38: 733-39.

K.A. Woods, M. Van Helvoirt, K.K.L. Ong, A. Mohn, J. Levy, F. De Zegher, D.B. Dunger, The Somatotropic Axis in Short Children Born Small for Gestational Age: Relation to Insulin Resistance, Pediatr. Res. 2002; 51: 76-80.

K.K.L. Ong, M.A. Preece, P.M. Emmett, M.L. Ahmed, D.B. Dunger, Size at Birth and Early Childhood Growth in Relation to Maternal Smoking, Parity and Infant Breast-Feeding: Longitudinal Birth Cohort Study and Analysis, Pediatr. Res. 2002; 52: 863-867.

E. Colle, D. Schiff, G. Andrew, C.B. Bauer, P. Fitzhardinge, Insulin Responses During Catch-Up Growth of Infants Who Were Small for Gestational Age, Pediatrics 1976; 57: 363-71.

M.S. Kramer, M. Olivier, F.H. McLean, D.M. Willis, R.H. Usher, Impact of Intrauterine Growth Retardation and Body Proportionality on Fetal and Neonatal Outcome, Pediatrics 1990; 85: 707-13.

N. Stettler, B.S. Zemal, S. Kumanyika, V.A. Stallings, Infant Weight Gain and Childhood Overweight Status in a Multicenter, Cohort Study, Pediatrics 2002; 109: 194-99.

R. A. McCance, E.M. Widdowson, The Determinants of Growth and Form, Proc. R. Soc. Lond. B. Biol. Sci. 1974; 185: 1-17.

C. Yosefy, J.Reuven Viskoper, A. Laszt, R.Priluk, E. Guita, D. Varon, Z.Illan, E.M. Berry, N. Savion, Y. Adan, G. Lugassy, R. Schneider, A. Raz, The Effect of Fish Oil on Hypertension, Plasma Lipids and Hemostasis in Hypertensive, Obese, Dyslipidemic Patients With and Without Diabetes Mellitus, Prostaglandins Leukot Essen Fatty Acids 1999; 61: 83-87.

T.J. Cole, Sympercents: Symmetric Percentage Differences on the 100 Log Scale Simplify the Presentation of Log Transformed Data, Stat. Med. 2000: 19: 3109-25.

Singhal, A., Breatmilk Feeding and Lipoprotein Profile in Adolescents Born Preterm: Follow-Up of a Prospective Randomised Study Singhal, A., The Lancet vol. 565 May 2004.

(56) References Cited

OTHER PUBLICATIONS

J. Heinrich, H. Schulte, R. Schoenfeld, E. Koehler, G. Assmann, Association of Variables of Coagulation, Fibrinolysis and Acute-Phase With Atherosclerosis in Coronary and Peripheral Arteries and Those Arteries Supplying the Brain, Thromb. Haemost 1995; 73: 374-79.

N.B. Metcalfe, P. Monaghan, Compensation for a Bad Start: Grow Now, Pay Later?, Trends Ecol. Evol 2001; 16: 254-60.

Kramer, M.S., "Do Breastfeeding and Delayed Introduction of Solid Foods Protect Against Subsequent Obesity?", J. Pediatric 1991; 98: 883-887.

Office action from Canadian patent application No. 2,515,378, dated Aug. 12, 2010.

Office action from Ecuador patent application No. PCT-05-6008, dated Sep. 10, 2010.

Singhal, A., et al., "A low nutrient intake and early growth for later insulin resistance in adolescents born preterm.", Lancet 2003; vol. 361, pp. 1089-1097.

Singhal, A., et al., "Breastmilk feeding and lipoprotein profile in adolescents born preterm: follow-up of a prospective randomised study.", Lancet 2004; vol. 363, pp. 1571-1578.

Singhal, A., et al., "Is slower early growth beneficial for long-term cardiovascular health?", Circulation 2004; vol. 109, pp. 1108-1113.

Stettler, N., et al., "Rapid weight gain during infancy and obesity in young adulthood in a cohort of African Americans," Am. J. Clin. Nutr. 2003; vol. 77, pp. 1374-1378.

Stettler, N., "Nature and strength of epidemiological evidence for origins of childhood and adulthood obesity in the first year of life," Pediatric Rev. 2007; vol. 31, pp. 1035-1043.

Yanovski, J., "Rapid weight gain during infancy as a predictor of adult obesity," Am. J. Clin. Nutr. 2003; vol. 77, pp. 1350-1351.

Owen, C.G., et al., "Effect of infant feeding on the risk of obesity across the life course: a quantitative review of published evidence.", Pediatrics 2005; vol. 115, pp. 1367-1377.

Martin, R.M., et al, "Breast feeding and cardiovascular disease risk factors, incidence, and mortality: the Caerphilly study.", J. Epidemiol Community Health 2005; vol. 59, pp. 121-129.

Chomtho, S., et al., "Infant growth and later body composition: evidence form the 4-component model.", Am J. Clin. Nutr. 2008; pp. 1776-1784.

Arenz, S., et al., "Breast-feeding and childhood obesity—a systematic review.", Int. J. Obes. 2004; vol. 28, pp. 1247-1256.

Owen, C.G., "Does initial breastfeeding lead to lower blood cholesterol in adult life?", Am. J. Clin. Nutr. 2008; vol. 88, pp. 305-314.

Owen, C.G., et al., The effect of breastfeeding on mean body mass index throughout life: a quantitative review of published and unpublished observational evidence., Am J. Clin. Nutr. 2005; vol. 82, pp. 1298-1307.

Owen, C.G., et al., "Does breastfeeding influence risk of type 2 diabetes in later life? A quantitative analysis of published evidence.", Am. J. Clin. Nutr. 2006; vol. 84, pp. 1043-1054.

Hardner, T., et al., "Duration of Breastfeeding and Risk of Overweight: A meta-Analysis.", Am. J. Epidemiol. 2005; vol. 162, pp. 397-403.

Owen, C.G., et al., Effect of breast feeding in infancy on blood pressure in later life: systematic review and meta-analysis; BMJ 2003; vol. 327, pp. 1189-1195.

Fomon, S., et al., "Influence of Formula Concentration on Caloric Intake and Growth of Normal Infants," Acta Paediatr Scand 1975; vol. 64, pp. 172-181.

Fomon, S., et al., "Infant Nutrition," 2nd Ed. (1974), pp. 27-29.

Dennison, B., et al., "Rapid Infant Weight Gain Predicts Childhood Overweight," Obesity (Mar. 3, 2006), vol. 14, No. 3, pp. 491-498.

Eid, E., "Follow-Up Study of Physical Growth of Children Who Had Excessive Weight Gain in First Six Months of Life," Agriculture and Health (Apr. 11, 1970), pp. 74-76.

Gillman, M., "The first months of life: a critical period for development of obesity," Am. J. Clin. Nutr. 2008, vol. 87, pp. 1587-1589.

Martin, R., et al., "Infant nutrition and blood pressure in early adulthood: the Barry Caerphilly Growth Study," Am. J. Clin. Nutr. 2003; vol. 77, pp. 1489-1497.

Singhal, A., et al., "Early nutrition and leptin concentrations in later life," Am. J. Clin. Nutr. 2002; vol. 75, pp. 993-999.

Monterio, P.O.A.,and Victora, C. G., "Rapid growth in infancy and childhood and obesity in later life—a systemic review," Obesity 2005; vol. 6, pp. 143-154.

Botton, J, et al., "Postnatal weight and height growth velocities at different ages between birth and 5 y and body composition in adolescent boys and girls," Am. J. Clin. Nutr. 2008; vol. 87, pp. 1760-1768.

Lucas, A., "Programming by early nutrition in man," CIBA Foundation Symposium 156 (1991), pp. 38-55.

J.G. Eriksson, T. Forsen, J, Tuomilehto, P.D. Winter, C. Osmond, D,J.P Barker, Catch-Up Growth in Childhood and Death From Coronary Heart Disease: Longitudinal Study, BMJ 1999; 318: 427-431.

J.G. Eriksson, T. Forsen, J. Tuomilehto, C. Osmond, D.J.P. Barker, Early Growth and Coronary Heart Disease in Later Life: Longitudinal Study, BNJ 2001; 322: 949-53.

K.E. Sorensen, D.S. Calermajer, D.J. Spieglehalter, D. Georgakopoulos, J. Robinson, T. Odette, J.E. Deanfield, Non-Invasive Measurement of Human Endothelium Dependent Arterial Responses: Accuracy and Reproductibility, Br. Heart J. 1995; 74: 247-253.

F. Marangoni, C. Agostoni, A.M. Lammardo, M. Giovannini, C. Galli, E. Riva, Polyunsaturated Fatty Acid Concentrations in Human Hindmilk Are Stable Throughout 12-Months of Lactation and Provide a Sustained Intake to the Infant During Exclusive Breastfeeding: An Italian Study, Br. J. Nutr 2000; 84: 103-109.

A. Plagemann, T. Harder, A. Rake, M. Voits, H. Fink, W. Rohde, G. Doerner, Perinatal Elevation of Hypothalamic Insulin, Acquired Malformation of Hypothalamic Galaninergic Neurons, and Syndrome X-Like Alterations in Adulthood of Neonatally Overfed Rats, Brain Research 1999; 836: 146-55.

A. Bayes-Genis, C.A. Conover, R.S. Schwartz, The Insulin-Like Growth Factor Axis: A Review of Atherosclerosis and Restenosis, Circ. Res. 2000; 86: 125-130.

W.P.Castelli. R.D. Abbott, P.M. McNamara, Summary of Estimates of Cholesterol Used to Predict Coronary Heart Disease, Circulation 1983; 67: 730-34.

I. Holme, an Analysis of Randomized Trials Evaluating the Effect of Cholesterol Reduction on Total Mortality and Coronary Heart Disease Incidence, Circulation 1990; 82: 1916-24.

D.S. Celermajer, K.E. Sorensen, D. Georgakopoulos, C. Bull, T. Odette, J. Robinson, J.E. Deanfield, Cigarette Smoking is Associated With Dose-Related and Potentially Reversible Impairment of Endothelium-Dependent Dilation in Healthy Young Adults, Circulation 1993; 88: 2149-2155.

A.L. Gould, J.E. Rossouw, N.C. Santanello, J.F. Heyse, C.D. Furberg, Cholesterol Reduction Yields Clinical Benefit: A New Look at Old Data, Circulation 1995; 91(8): 2274-82.

G.C. Curhan, G.M. Chertow, W.C. Willett, D. Spiegelman, G.A. Colditz, J.E. Manson, F.E. Speizer, M.J. Stampfer, Congestive Heart Failure/Ventricular Hypertrophy/Heart Transplantation: Birth Weight and Adult Hypertension and Obesity in Women, Circulation 1996; 94: 1310-5.

G.C. Curhan, W.C. Willett, E.B. Rimm, D. Spiegelman, A.L. Ascherio, M.J. Stampfer, Prevention of Cardiovacular Disease: Birth Weight and Adult Hypertension, Diabetes Mellitus, and Obesity in US Men, Circulation 1996; 94: 3246-50.

C.P.M. Leeson, P.H. Whincup, G.D. Cook, A.E. Donald, O. Papacosta, A. Lucs, J.E. Deanfield, Flow-Mediated Dilation in 9- to 11-Year-Old Children: The Influence of Intrauterine and Childhood Factors, Circulation 1997; 96: 2233-38.

E. Koukkou, P. Ghosh, C. Lowy, L. Poston, Offspring of Normal and Diabetic Rats Fed in Pregnancy Demonstrate Vascular Dysfunction, Circulation 1998; 98: 2899-904.

W.K. Legrand, C.A. Visser, W.T. Hermens, H.W.M. Niessen, F.W.A. Verheugt, G.J. Wolbink, C.E. Hack, C-Reactive Protein as a Cardiovascular Risk Factor More Than an Epiphenomenon?, Circulation 1999; 100: 96-102.

(56) References Cited

OTHER PUBLICATIONS

V. Schachlinger, M.B. Britten, A.M. Zeihler, Prognostic Impact of Coronary Vasodilator Dysfunction on Adverse Long-Term Outcome of Coronary Heart Disease, Circulation 2000; 101: 1899-1906.

C.P.M. Leeson, M. Kattenhorn, R. Morley, Impact of Low Birth Weight and Cardiovascular Risk Factors on Endothelial Function in Early Adult Life, Circulation 2001; 103: 1264-1268.

C.M. Law, A.W. Shiell, C.A. Newsom, Fetal, Infant, and Childhood Growth and Adult Blood Pressure: A Longituadinal Study From Birth to 22 Years of Age, Circulation 2002; 105: 1088-1092.

A. Singhal, T.J. Cole, M. Fewtrell, J Deansfield, A. Lucas, Is Slower Early Growth Beneficial for Long-Term Cardiovascular Health?, Circulation 2004; 109:9 1108-1113.

W. Oh, Renal Functions and Clinical Disorders in the Neonate, Clin Perinatal 1981; 8: 215-23.

W.T. Friedewald, R.I. Levy, D.S. Fredrickson, Estimation of the Concentration of Low-Density Lipoprotein Cholesterol in Plasma, Without Use of the Preparative Ultracentrifuge, Clin. Chem 1972; 18: 499-502.

S.V. Gelding, C. Andreas, R. Niththyananthan, I.P. Gray, H. Mather, D.G. Johnston, Increased Secretion of 32,33 Split Proinsulin After Intraveous Glucose-Tolerant First-Degree Relatives of Patients With Non-Insulin Dependent Diabetes of European, But Not Asian, Origin, Clin. Endocrinol 1995; 44: 255-64.

P.M. Clark, P.C. Hindmarsh, A.W. Schiell, C.M. Law, J.W. Honourt, D.J.P. Barker, Size at Brith and Adrenaocortical Function in Childhood, Clin. Endocrinol. 1996; 45: 721-6.

T. Murakami, B. Kaku, Y. Arai, Long-Term Follow-Up for Cardiovascular Events After Non-Invasive Ultrasonic Evaluation for Vasomotor Dysfunction, Clin. Sci. 2000; 102: 2404.

Standard for Infant Formula and Formulas for Special Medical Purposes Intended for Infants, Codex Stan 72-1981.

S. Klein, S.W. Coppack, V. Mohamed-Ali, M. Landt, Adipose Tissue Leptin Production and Plasma Leptin Kinetics in Humans, Diabetes 1996; 45: 984-7.

S.D. Chessler, W.Y. Fujimoto, J.B. Shofer, E.J. Boyko, D.S. Weigie, Increased Plasma Leptin Levels Are Associated With Fat Accumulation in Japanese Americans, Diabetes 1998; 47: 239-43.

A. Fritsche, A. Madaus, N. Stefan, O.Tschritter, E. Maerker, A. Tiegeler, H. Haering, M. Stumvoll, Relationships Among Age, Proinsulin Conversion, and Beta-Cell Function in Nondiabetic Humans, Diabetes 2002; 51 (Suppl): S234-39.

A.S. McAllister, G.D. Johnston, A.B. Atkinson, Relationship of Endothelial Function to Birth Weight in Humans, Diabetes Care 1999; 22: 2061-2066.

A. Plagemann, K. Frank, T Harder, R Kohlhoff, Long-Term Impact of Neonatal Breat-Feeding on Body Weight and Glucose Tolerance in Children of Diabetic Mothers, Diabetes Care 2002; 25: 16-22.

N.J. Wareham, N.E. Day, C.D. Byrne, C.N. Hales, R. Williams, Fasting Proinsulin Concentrations Predict the Development of Type 2 Diabetes, Diabetic Care 1999; 22: 262-70.

D.I.W. Phillips, D.J.P. Barker, C.N. Hales, S. Hirst, C. Osmond, Thinness at Birth and Insulin Resistance in Adult Life, Diabetologia 1994; 37:150-54.

L. Mykkaned, S.M. Haffner, J. Kuusisto, K. Pyorala, C.N. Hales, M. Laasko, Serum Proinsulin Levels Are Disproportionately Increased in Elderly Prediabetic Subjects, Diabetologia 1995; 38: 1176-82.

M. Fewtrell, C. Doherty, T.J. Cole, M. Stafford, C.N. Hales, A. Lucas, Effects of Size at Birth, Gestational Age and Early Growth in Preterm Infants on Glucose and Insulin Concentrations at 9-12 Years, Diabetologia 2000; 43: 714-17.

G.E. Mott, D.S. Lewis, E.M. Jackson, C.A. McMahan, Preweaning Diet Prorams Postweaning Plasma Thyrosine Concentraitons in Baboons, Dietrary Programming of Thyroid Hormones 1996; 212: 342-48.

C.J. Dyer, J.M. Simmons, R.L. Matteri, D.H. Keisler, Leptin Receptor mRNA Is Expressed in EWE Anterior Pituitary and Adipose Tissues and is Differentially Expressed in Hypothalamic Regions of Well-Fed and Feed-Restricted EWES, Domestic Anim. Endocrinol 1997; 14: 119-28.

V. Strbak, M. Hromadova, L. Kostalova, A. Kapellerova, Search for Optimal Age for Weaning-Tem-Year Prospective Study, Endocrin. Regulations 1993; 27: 215-221.

G.S. Roth, D.K. Ingram, A. Black, M.A. Lane, Effects of Reduced Energy Intake on the Biology of Aging: The Primate Model, Eur. J. Clin. Nutr 2000; 54 (Suppl): S15-20.

S. Plancoulaine, M.A. Charles, L. Lafay, M. Tauber, N. Thibult, J.M. Borys, E. Eschwege, Fleurbaix Laventie Ville Sante Study Group, Infant-Feeding Patterns Are Related to Blood Cholesterol Concentration in Prepubertal Children Aged 5-11 Yr: The Fleurbaix-Laventie Ville Sante Study, Eur. J. Clin. Nutr. 2000; 54: 114-19.

A. Plagemann, I. Heidrich, F. Gotz, W. Rohde, G. Dorner, Obesity and Enhanced Diabetes and Cardiovascular Risk in Adult Rats Due to Early Postnatal Overfeeding, Exp. Clin. Endocrinol 1992; 99: 154-58.

Gerstenberger H J, Studies in the Adaptation of an Artificial Food to Human Milk, Gerstenberger 1 US Journal of Diseases of Children Oct. 1915.

International Preliminary Report on Patentability for PCT/GB04/000518, dated Aug. 30, 2005.

Written Opinion of the International Search Authority for PCT/GB04/000518, dated Aug. 10, 2005.

Morita, New Food Industry, vol. 35(11), pp. 61-72 (1993).

International Preliminary Report on Patentability for PCT/IP2009/055832, dated Jun. 21, 2011.

Non-Final Office Action for U.S. Appl. No. 13/176,682, dated Mar. 20, 2012.

Wikipedia online definition of Food Energy, accessed on Sep. 18, 2008.

Must, et al., The Disease Burden Associated With Overweight and Obesity, JAMA, vol. 282, No. 16, po. 1523-1529.

K.K. Ong, et al., Association Between Postnatal Catch-up Growth and Obesity in Childhood: prospective cohort study, BMJ, vol. 320, pp. 967-971 (2000).

A. Peeters, et al., Obesity in Adulthood and Its Consequences for Life Expectancy: A Life-Table Analysis, Annals of Internal Medician, vol. 138, No. 1., pp. 24-33 (2003).

T. Lakka, et al., Abdominal Obesity is Associated With Accelerated Progression of Carotid Atherosclorosis in Men, Atherosclerosis, vol. 154, pp. 497-504 (2001).

F. Pi-Sunyer, Medical Hazards of Obesity, Ann. Intern. Med., vol. 119, No. 7, Pt. 2, pp. 655-660 (1993).

M. Velasquez, et al., Leptin and Its Relation to Obesity and Insulin in the SHR/N-corpulent Rat, a Model of Type II Diabetes Mellitus, Int. Jnl. Experimental Diab. Res., vol. 2, pp. 217-223 (2001).

N-F Chu, et al., Plasma Leptin Concentrations and Four-Year Weight Gain Among US Men, International Journal of Obesity, vol. 25, pp. 346-353 (2001).

Office Action Received from USPTO in U.S. Appl. No. 11/822,078, mailed May 6, 2010.

Opposition of EP Patent No. 1 605 780 by Nestec S.A., mailed Feb. 17, 2010.

Responsive Amendment for U.S. Appl. No. 10/806,169 dated Apr. 24, 2007.

Examiner-Initiated Interview Summary for U.S. Appl. No. 10/806,169 dated Dec. 27, 2007.

Amendment B and Response after Non-Final Office Action for U.S. Appl. No. 11/822,078 dated Sep. 27, 2010.

Amendment C and Response after Final Office Action with RCE for U.S. Appl. No. 11/822,078 dated Feb. 25, 2011.

Notice of Allowance for U.S. Appl. No. 11/822,078 dated Apr. 6, 2011.

Boyles, Salynn "Breast Feeding and Later Obesity", WebMd Health News, Apr. 24, 2007.

Communication under Rule 71(3) EPC re Intention to Grant EP Application No. 04709282.0 dated May 16, 2008.

Response to Feb. 17, 2010 Opposition of EP Patent No. 1 605 780 dated Sep. 30, 2010.

Letter Responsive to Sep. 30, 2010 Response of EP Patent No. 1 605 780 dated Aug. 9, 2011.

Summons to Attend Oral Proceedings in Opposition of EP Patent No. 1 605 780 dated Apr. 2, 2012.

(56) References Cited

OTHER PUBLICATIONS

Response to Summons to Attend Oral Proceedings in Opposition of EP Patent No. 1 605 780 dated Sep. 14, 2012.
Patentees' Response to Sep. 14, 2012 correspondence regarding Opposition in EP Patent No. 1 605 780 dated Oct. 2, 2012.
Communication dated Oct. 15, 2012 regarding Opponents' letters of Oct. 10, 2012 and Oct. 11, 2012 in the Opposition of EP Patent No. 1 605 780.
Communication dated Oct. 15, 2012 regarding Patentees' letter of Oct. 10, 2012 in the Opposition of EP Patent No. 1 605 780.
Patentees' Letter dated Oct. 11, 2012 in response to Opponents' letter filed earlier Oct. 11, 2012.
Communication dated Nov. 14, 2012 regarding Minutes of the Oral Proceedings before the Opposition Division on Oct. 16, 2012 in EP Patent No. 1 605 780.
Decision Rejecting Opposition in EP Patent No. 1 605 780 dated Nov. 14, 2012.
Notice of Appeal by Nestec SA in EP Patent No. 1 605 780 dated Dec. 6, 2012.
Nestec SA's Statement setting out the grounds of Appeal dated Apr. 4, 2013.
"Human energy requirements", Report of a Joint FAO/WHO/UNU Expert Consultation, Rome, Oct. 17-24, 2001.
Webster's Encyclopedic Dictionary, definition of "nutrient", 1996 revised edition, p. 689.
International Search Report and Written Opinion for PCT/GB2004/000518 dated Jun. 4, 2004.
Office Action in U.S. Appl. No. 10/806,169 dated Jan. 25, 2007.
Final Office Action in U.S. Appl. No. 10/806,169 dated May 25, 2007.
Amendment B for U.S. Appl. No. 13/176,682 dated Jun. 11, 2012.
Office Action in U.S. Appl. No. 13/176,682 dated Aug. 16, 2012.
Amendment with RCE for U.S. Appl. No. 13/176,682 dated Dec. 17, 2012.
Office Action in U.S. Appl. No. 13/176,682 dated Jun. 18, 2013.
Office Action from EC Application No. PCT-05-6008 dated May 31, 2011.
Barker, "Fetal Origins of Coronary Heart Disease", BMJ 311: 171-174 (Jul. 1995).
Must, et al., "The Disease Burden Associated with Overweight and Obesity", JAMA vol. 282, No. 16, pp. 1523-1529.
Stettler, et al., "Weight Gain in the First Week of Life and Overweight in Adulthood: A Cohort Study of European American Subject Fed Infant Formula," Circulation 2005 vol. 111, pp. 1897-1903.
Office Action in IL No. 208378 dated Jan. 15, 2012.
Response to Office Action in U.S. Appl. No. 13/176,682 dated Sep. 18, 2013.
English translation of Office Action in BR Application No. P-10407220 dated Jun. 4, 2013.
Notice of Allowance for U.S. Appl. No. 13/176,882 dated Jan. 9, 2014.
Communication in EP Appl. No. 09 151 486.9 dated Jan. 3, 2014.
Gerstenberger, H J, Studies in the Adaptation of an Artificial Foor to Human Milk, Gerstenberger 2 US Journal of Diseases of Children Jan. 1919.
M.J. Mullen, S.A. Thorne, J.E. Deanfield, Non-Invasive Assessment of Endothelial Function, Heart 1997; 4: 297-298.
J.M. Glelijnse, A. Hofman, J.C.M. Witteman, A.A.J.M. Hazebroek, H.A. Valkenburg, D.E. Grobbee, Long-Term Effects of Neonatal Sodium Restriction on Blood Pressure, Hypertension 1997; 29: 913-17.
C.G. Victoria, F.C. Barros, B.L. Horta, R. Martorell, Short-Term Benefits of Catch-Up Growth for Small for Gestational Age Infants, Int. J. Epidemiol 2001; 30: 1325-30.
M.F. Rolland-Cachera, M. Deheeger, M. Akrout, F. Bellisle, Influence of Macronutrients on Adiposity Development: A Follow Up Study of Nutrition and Growth From 10 Months to 8 Years of Age, Int. J. Obes. Relat. Metab Disord. 1995; 19: 573-8.

D.I.W. Phillips. C.H.D. Fall., C. Cooper, R.J. Norman, J.S Robinson, P.C. Owens, Size at Birth and Plasma Leptin Concentrations in Adult Life, Int. J Obes. Relat. Metab. Disord 1999; 23: 1025-9.
T.J. Parsons, C.Power, S. Logan, C.D. Summerbell, Childhood Predictors of Adult Obesity: A Systemic Review, Int.J. Obes. Relat. Metab Disord 1999, 23(Supp): S1-107.
P. Clarkson, D.S Celermajer, A.E. Donald, M. Sampson, K.E. Sorensen, M. Adams, D,K, Yue. D,J, Betteridge, J.E. Deanfield, Impaired Vascular Reactivity in Insulin-Dependent Diabetes Mellitus is Related to Disease Duration and Low Density Lipoprotein Cholesterol Levels, J. Am. Coll. Cardiol. 1996; 28: 573-579.
T. J. Anderson, A. Uehata, M.D. Gerhard, I.T. Meredith, S. Knab, D. Delagrange, E.H. Lieverman, P. Ganz, M.A. Creager, A.C. Yeung, A.P. Selwyn, Close Relation of Endothelial Function in the Human Coronary and Peripheral Circulations, J. Am. Coll. Cariol. 1995; 26: 1235-1241.
D.S. Lewis, H.A. Bertrand, C.A. McMahan, H.C. McGill, K.D. Carey, E.J. Masoro, Preweaning Food Intake Influences the Adiposity of Young Adult Baboons, J. Clin Invest 1986; 78:899-905.
P.J. Havel, S. Kasim-Karakas, W. Mueller, P.R. Johnson, R.L. Gingerich, J.S. Stern, Relationship of Plasma Leptin to Plasma Insulin and Adiposity in Normal Weight and Overweight Women: Effects of Dietary Fat Content and Sustained Weight Loss, J. Clin. Endocrinol. Metab 1996; 81: 4406-13.
D. Chin, S.E. Oberfield, M.E. Silfen, D.J. McMahon, A.M. Manibo, D. Accili, L.S. Levine, Proinsulin in Girls: Relationship to Obesity, Hyperinsulinemia, and Puberty, J. Clin. Endogrinol. Metab. 2002; 87: 4673-77.
D.S, Lewis; H.A. Bertrand, C.A. McMahan, H.C. McGill, K.D. Carey, E.J. Masoro, Preweaning Food Intake Influences the Adiposity of Youg Adult Baboons, J. Clin. Invest 1986; 78: 899-905.
T, Baranowski, G.T. Bryan, J.A. Harrison, D.K. Rassin, K.A. Greaves, J.H. Barancwski, Height, Infant-Feeding Practices and Cardiovascular Funtioning Among 3 or 4 Year Old Children in Three Ethnic Groups, J. Clinic Epidemiol 1992; 45: 513-18.
C.M. Law, D.J.P. Barker, C. Osmond, C.H.D. Fall, S.J. Simmonds, Early Growth and Abdominal Fatness in Adult Life, J. Epidemic. Community Health 1992; 46: 184-6.
M.G. Marmot, C.M. Page, Effect of Breast-Feeding on Plasma Cholesterol and Weight in Young Adults, J Epidemiol. Community Health 1980; 34: 164-167.
J.D. Kark, G. Troya, Y. Friedlander, P.E. Slater, Y. Stein, Validity of Maternal Reporting of Breast Feeding History and the Association With Blood Lipids in 17 Year Olds in Jerusalem, J. Epidemiol Community Health 1984; 38: 218-25.
M. Law, Alistair W. Shiell, Is Blood Pressure Inversely Related to Birth Weight? The Strength of Evidence From a Systematic Review of the Literature Catherine, J. Hypertens 1996: 14:935-41.
A. Plagemann, T. Harder, A. Rake, T. Waas, K. Melchior, T. Ziska, W. Rohde, G. Dorner, Observations on the Orexigenic Hypothalamic Neuropeptide Y-System in Neonatally Overfed Weaning Rats, J. Neuroendocrinol 1999; 11: 541-6.
P. Hahn, Effect of Litter Size on Plasma Cholesterol and Insulin and Some Liver and Adipose Tissue Enzymes in Adult Rodents. J. Nutr 1984; 114: 1231-1234.
C.M. McCay, M.F. Crowell, L.A. Maynard, The Effect of Retarded Growth Upon the Length of Life Span and Upon the Ultimate Body Size, J. Nutr. 1935; 10: 63-79.
M. Hamosh, Does Infant Nutrition Affect Adiposity and Cholesterol Levels in the Adult?, J. Pediatr. Gastroenterol, Nutr 1988; 7: 10-16.
M.S. Kramer, Do Breast-Feeding and Delayed Introduction of Solid Foods Protect Against Subsequent Obesity?, J. Pediatric. 1991; 98: 883-7.
W.S. Agras, H.C. Kraemer, R.I. Berkowitz. L.D. Hammer, Influence of Early Feeding Style on Adiposity at 6 Years of Age, J. Pediatrics 1990; 116: 805-9.
S. Ebrahim, G.D. Smith, Lowering Blood Pressure: A Systematic Review of Sustained Effects of Non-Pharmacological Interventions, J. Public Health Med 1998; 20: 441-48.
M. Deiber, D. Chatelain, D. Naville, G. Putet, B. Salle, Functional Hypersomatotropism in Small for Gestational Age (SGA) Newborn Infants, J.Clin. Endocrinol. Metab 1989; 68: 232-34.
R.A. Mccance, Food, Growth and Time, Lancet 1962; 2: 671-76.

(56) References Cited

OTHER PUBLICATIONS

A. Lucas, D.L. Sarson, A.M. Blackburn, T.E. Adrian, A. Aynsley-Green, Breast Vs Bottle: Endocrine Responses Are Different With Formula Feeding, Lancet 1980; 1: 1267-69.
D.J.P. Barker, P.D. Winter, C. Osmond, B. Margetts, S.J. Simmonds, Weight Infancy and Death From Ischaemic Heart Disease, Lancet 1989; 2. 577-80.
D.J.P. Barker, P.D. Gluckman, K.M. Godfrey, J.E. Harding, J.A. Ovvens, J.S. Robinson, Fetal Nutrition and Cardiovascular Disease in Adult Life, Lancet 1993; 341 938-41.
S. Frankel, P. Elwood, P. Sweetnam, G.D. Smith, Birthweight, Body-Mass Index in Middle Age and Incident of Coronary Heart Disease, Lancet 1996; 348: 1478-80.
P. Pauletto, M. Puato, M.G. Caroli, E. Casiglia, A.E. Munhambo, G. Cazzolato, G.B. Bon, M.T. Agneli, C. Galli, A.C. Pessina, Blood Pressure and Atherogenic Lipoprotein Profiles of Fish-Diet and Vegetarian Villagers in Tanzania: The Lugalawa Study, Lancet 1996; 348: 784-88.
D.J. Pettitt, M.R. Forman, R.L. Hanson, W.C. Knowler, P.H. Bennett, Breastfeeding and Incidence of Non-Insulin-Dependent Diabetes Mellitus in Pima Indians, Lancet 1997, 350: 166-68.
C.N. Martyn, C.R. Gale, S. Jespersen, Impaired Fetal Growth and Atherosclerosis of Carotid and Peripheral Arteries, Lancet 1998; 352: 173-178.
R.J. Irving, N.R. Belton, R.E. Elton, B.R. Walker, Adult Cardiovascular Risk Factors in Premature Babies, Lancet 2000; 355: 2135-36.
Atul Singhal, Tim J. Cole, Alan Lucas, Early Nutrition in Preterm Infants and Later Blood Pressure: Two Cohorts After Randonised Trials, Lancet 2001: 357:413-19.
Correspondence, Neonatal Salt Intake and Blood Pressure, Lancet 2001; 357: 1880-81.
Singhal, Atul, Early nutrition in pre-term infants and later blood pressure: 2 cohorts after randomised trials, Lancet 2001; 357: 413-19.
A. Singhal, M. Kattenhorn, T.J. Cole, J. Deanfield, A. Lucas, Preterm Birth, Vascular Function, and Risk Factors for Atherosclerosis, Lancet 2001; 358 1159-60.
G. Walldius, I. Jungner, I. Holme, A.H. Aastveit, W. Kolar, E. Steiner, High Apolipoprotein B, Low Apolipoprotien A-1 and Improvement in the Prediction of Fatal Myocardail Infarction (Amoris Study): A Prospective Study, Lancet 2001; 358: 2026-33.
Correspondence, Early Postnatal Undernutrition in Preterm Infants and Reduced Risk of Insulin Resistance, Lancet 2003; 36: 2248-49.
A. Singhal, M. Fewtrell, T. Cole, A. Lucas, Low Nutrient Intake and Early Growth for Later Insulin Resisstance in Adolescents Born Preterm, Lancet 2003: 361: 1089-97.
Singhal, A., Early Original of Cardiovascular Disease: Is Ther a Unifying Hypothesis?, Lancet 2004: 363: 1642-45.
Singhal, Atul, Low Nutrition Intake & Early Growth for Later Insulin Resistance in Adolescents Born Preterm, Lancet vol. 361 Mar. 2003.
S.M. Gore, Statistical Considerations in Infant Nutrition Trials, Lipids 1999; 34: 185-97.
De Wit. J N, Nutritional & Functional Characteristics of Whey Proteins in Food Products, Marschall Rhone-Poulenc Award Lecture.
P.A. Hodgson. R.D. Ellefson, L.R. Elvebck, L.E. Harris, R.A. Nelson, W.H. Weidman, Comparison of Serum Cholesterol in Children Fed High, Moderate, or Low Cholesterol Milk Diets During Neonatal Period, Metabolism 1976; 25: 739-46.
Lucas, A., Programming by Early Nutrition in Man, MRC Dunn Nutrition Unit.
Singhal, Atul, Early Nutrition and Leptin Concentrations in Later Life, JA313408.
A.C. Wilson, J.S. Forsyth, S.A. Greene, L. Irvine, C. Hau, P.W. Howie, Relation of Infant Diet to Childhood Health: Seven Year Follow Up of Cohort of Children in Dundee Infant Feeding Study, BMJ 1998; 316: 21-25.

A. Lucas, R. Morley, T.J. Cole, Randomised Trial of Early Diet in Preterm Babies and Later Intelligence Quotient, BMJ 1998; 317: 1481-87.
D.A. Leon, H.O. Lithell, D. Vagero, I. Koupilova, R. Mohsen, L. Berglund, U-B Lithell, P.M. Mckeigue, Reduced Fetal Growth Rate and Increased Risk of Death From Ischaemic Heart Disease: Cohort Study of 15000 Swedish Men and Women Born 1915-29, BMJ 1998; 317: 241-45.
J.G. Eriksson, T. Forsen, J, Tuomilehto, P.D. Winter, C. Osmond, D,J.P. Barker, Catch-Up Growth in Childhood and Death From Coronary Heart Disease: Longitudinal Study, BMJ 1999; 318: 427-431.
R. Von Kries, B. Koletzko, T. Sauerwald, E. Von Mutius, D. Barnert, V. Grunert, H. Von Voss, Breast Feeding and Obesity: Cross Sectional Study, BMJ 1999; 319: 147-50.
A. Lucas, M.S. Fewtrell, T.J. Cole, Fetal Origins of Adult Disease— The Hypothesis Revisited, BMJ 1999; 319: 245-49.
K.K.L. Ong, L. Ahmed, P.M. Emmett, M.A. Preece, D.B. Dunger & Avon Longitudinal Study of Pregnancy and Childhood Study Team, Association Between Postnatal Catch-Up Growth and Obesity in Childhood: Prospective Cohort Study, BMJ 2000; 320: 967-71.
T.J. Parsons, C. Power, O. Manor, Fetal and Early Life Growth and Body Mass Index From Birth to Early Adulthood in 1958 British Cohort: Longitudinal Study, BMJ 2001; 323: 1331-1335.
D.J.P. Barker, Fetal Origins of Coronary Heart Disease, BMJ 311: 171-174.
D.J.P. Barker, C. Osmond, S.J. Simmonds, G.A. Wield, The Relation of Small Head Circumference and Thinness at Birth to Death From Cardiovascular Disease in Adult Life, BMJ1993: 306:422-26.
J-G. Eriksson, T. Forsen, J. Tuomilehto, C. Osmond, D.J.P. Barker, Early Growth and Coronary Heart Disease in Later Life: Longitudinal Study, BNJ 2001; 322: 949-53.
W. Dietz, Critical Periods in Childhood for the Development of Obesity 1-3, Am. J. Clin. Nutr 1994; 59: 955-9.
R. Morley, A. Lucas, Randomized Diet in the Neonatal Period and Growth Performance Ultil 7.5-8 Y of Age in Preterm Children, Am. J. Clin. Nutr 2000; 71: 822-8.
F.I. Bennett, N. McFarlane-Anderson, R. Wilks, A. Luke, R.S. Cooper, T.E. Forrester, Leptin Concentration in Women is Influenced by Regional Distribution of Adipose Tissue 1-3, Am. J. Clin. Nutr. 1997; 66: 1340-4.
A.K. Lindroos, L. Lissner, B. Carlsson, L.M.S. Carlsson, J. Torgerson, C. Karlsson, K. Stenlof, L. Sjostrom, Familial Predisposition for Obesity May Modify the Predictive Value of Serum Leptin Concentrations for Long-Term Weight Change in Obese Women, Am. J. Clin. Nutr. 1998; 67: 1119-23.
A.CJ Ravelli, J. HP. Van Der Meulen, C. Osmond, D.J.P. Barker, O.P. Bleker, Obesity At the Age of 50 Y in Men and Women Exposed to Famine Prenatally 1-3, Am. J. Clin. Nutr. 1999; 70: 811-6.
R.M. Martin, A. Mccarthy, G.D. Smith, Infant Nutrition and Blood Pressure in Early Adulthood: The Barry Caerphilly Growth Cohort Study, Am. J. Clin. Nutr. 2003; 77: 1489-1497.
D.S. Seidman, A. Laor, R. Gale, D.K. Stevenson, Y.L. Danon, A Longitudinal Study of Birth Weight and Being Overweight in Late Adolescence, Am. J. Dis. Child 1991; 145: 782-5.
L.S. Webbre, S.R. Srinivasan, W.A. Wattigney, G.S. Berenson, Tracking of Serum Lipids From Childhood to Adulthood: The Bogalusa Heart Study, Am. J. Epidemiol. 1991; 133: 884-898.
Stettler, N., Weight Gain in the First Week of Life and Overweicht in Adulthood: A Cohort Study of European American Subject Fed Infant Formula, American Heart Association.
Anderson, Sue Ann, History & Current Status of Infant Formulas Anderson, American Journal of Clinical Nutrition 35, Feb. 1982.
Singhal, Atul, Early Nutrition & Leptin Concentrations in Later Life, American Soc for Clinical Nutrition 2002; 75993-9.

* cited by examiner

Energy and protein intake in infants randomized to lower-nutrient (starter formula) or standard formula (Similac). Data for breast-fed infants calculated from published values of breast-milk composition and volume intake.

BABY FEEDING FORMULA AND SYSTEM

CROSS-REFERENCE TO RELATED APPLICATIONS

This is a continuation-in-part of U.S. application Ser. No. 11/822,078 filed 2 Apr. 2007 which is a division of U.S. application Ser. No. 10/806,169, filed 23 Mar. 2004 which is a continuation-in-part of PCT/GB04/000518, filed Feb. 9, 2004, which claims priority from GB 0302929.5, filed 10 Feb. 2003; GB 0304482.3, filed 27 Feb. 2003; and GB 0318270.6, filed 5 Aug. 2003.

FIELD OF INVENTION

The present invention relates to infant formulas and methods for using the formulas in feeding newborn infants.

BACKGROUND OF THE INVENTION

There are many different infant nutritional formulas that are commercially available or otherwise known in the infant formula art. These infant formulas comprise a range of nutrients to meet the nutritional needs of the growing infant, and typically include lipids, carbohydrates, protein, vitamins, minerals, and other nutrients helpful for optimal infant growth and development.

Most of these nutritional infant formulas are designed to assimilate or duplicate the composition and function of human milk. It is generally recognized, however, that human milk is preferred over synthetic infant formulas for the feeding of infants. It is also known that human milk provides improved immunological benefits to the breastfed infant, as well as long-term benefits in the area of certain cognitive developments.

It is also well known that the composition of human milk changes over the first few weeks following delivery of an infant. Human milk is referred to as colostrum during the first 5 days after birth, transition milk during days 6-14 after birth, and mature milk thereafter, and during each stage of lactation, the corresponding human milk composition differs considerably. Colostrum and transition milk, for example, have lower caloric densities than mature milk, as well as higher protein and lower carbohydrate concentrations. Vitamin and mineral concentrations also vary in the three defined human milk groups.

Most commercial infant formulas are similar in composition, although not identical, to mature human milk, and are used in both newborns as well as older infants. It is generally believed that the nutrient composition and higher energy content of mature milk, and thus the nutrient composition and higher energy content of most commercial infant formulas, benefit newborn infants given the rapid growth rate of infants during the initial weeks of life. In short, it has heretofore been accepted that the feeding of newborn infants should be conducted with an emphasis on encouraging infant growth, and that such growth is best accomplished via the feeding with commercial infant formulas having a similar nutrient and energy content to mature human milk.

However, more than 100 years ago, critical windows in development were first described in relation to imprinting in chicks. That nutrition can act during such windows to affect later biology was shown in the 1960s by McCance who found that rats raised in small litters, and therefore overfed postnatally, were larger in adulthood. Subsequently, early overfeeding in rats was shown to raise later concentrations of plasma insulin and cholesterol, while early nutrition in baboons permanently affected later risk of obesity and atherosclerosis. To provide research focus for such long-term effects, Lucas proposed the term "programming" and initiated experimental studies to test this concept in man, see Lucas A., Programming by early nutrition in man: in: Bock G R, Whelan J Eds. *The childhood environment and adult disease*. (CIBA Foundation Symposium 156). Whiley, Chichester, UK. 1991: 38-55.

Atul Singhal et al., *Early nutrition in preterm infants and later blood pressure: two cohorts after randomised trials*, The Lancet, Vol. 357, Feb. 10, 2001 at p. 413 (the disclosure of which is incorporated herein by reference) explain that the potential effect of early nutrition on cardiovascular disease is an issue of major public-health importance. Associations between low weight and thinness at birth and hypertension and coronary-artery disease in later life were thought to be consistent with the hypothesis that avoidance of over-nutrition in early life 'programmes' later cardiovascular outcomes such as blood pressure. The authors had an opportunity to test the hypothesis that feeding of breastmilk to premature infants programmes later blood pressure in a formal experimental intervention trial. In the early 1980s, human-milk banks were in common use to provide preterm infants with breastmilk from unrelated donors. Random assignment of preterm infants to donated human milk or formula was ethical because at that time the optimum diet for babies born preterm was uncertain and the long-term outcomes of early feeding regimens unknown. The reported study started in 1982. It consisted of two parallel randomised trials: one compared banked breastmilk with nutrient-enriched preterm formula; the other compared a standard term formula with the nutrient-enriched preterm formula. Planned follow-up allowed the authors to test the generic hypothesis that early nutrition influences later blood pressure and the a-priori specific hypothesis that consumption of human milk in infancy leads to lower blood pressure in later life.

Preterm formula, compared with standard formula, was enriched in protein and fat (2.0 g protein and 4.9 g fat per 100 mL compared with 1.5 g protein and 3.8 g fat per 100 mL) but not in carbohydrate (7.0 g per 100 mL in both). For infants fed maternal milk, intakes of protein and energy were estimated from 4935 complete 24 h collections of milk (about 1.5 g protein, 3.0 g fat, and 7.0 g carbohydrate per 100 mL), and nutrient values for donated banked breastmilk were measured in more than 600 samples of pooled banked breastmilk and the averages calculated (about 1.1 g protein, 2.0 g fat, and 7.0 g carbohydrate per 100 mL). The sodium concentration was 19.6 mmol/L in preterm formula, 11.0 mmol/L in expressed breastmilk, 8.3 mmol/L in term formula, and 7.2 mmol/L in banked breastmilk. Preterm formula was designed overall to meet what were then understood to be the special nutrient needs of the preterm infant.

As expected, early weight gain was significantly greater in infants assigned nutrient-enriched preterm formula than in those assigned banked breastmilk. Among the children followed up at age 13-16 years, there were no significant differences in systolic or diastolic blood pressure between the randomised groups in trials 1 and 2 at age 7.5-8.0 years. At age 13-16 years, mean arterial pressure was significantly lower in children assigned banked breastmilk than in those assigned preterm formula, mean difference 4.1 mm Hg. Diastolic blood pressure was 3.2 mm Hg lower in infants assigned banked breastmilk than in those assigned a preterm formula, a benefit similar to the 2.3 mm Hg difference in diastolic and 3.5 mm Hg difference in systolic blood pressure observed previously in the non-randomised study of children born at term. A decrease of about 3 mm Hg in diastolic blood pressure, estimated from the authors' and previous epidemiological studies, could have substantial public-health implications. For instance, analysis of randomised trials and the Framingham study suggests that a lowering of population-wide diastolic blood pressure in adults by only 2 mm Hg would reduce the prevalence of hypertension by 17%, the risk of coronary heart disease by 6%, and the risk of stroke and transient ischaemic attacks by 15%. Addition of such an intervention to existing hypertension treatment could therefore prevent an estimated 67000 (6%) events of coronary heart disease and 34 000 (13%) of stroke or transient ischaemic attack, each year, among the 35-64 age-group, in the USA alone. Furthermore, a mean reduction in blood pressure of 3 mm Hg underestimates the degree of lowering and benefit to children at the extremes of the distribution for blood-pressure change and, because blood pressure tracks from childhood into adult life with amplification of early differences, the blood-pressure difference between breastfed and nonbreastfed populations is likely to be substantially greater in adulthood.

In the UK, donor breastmilk (provided by unrelated donors to a milk bank) was generally the low-fat foremilk that dripped from the contralateral breast during breastfeeding of the donor's own baby. The authors considered the possibility that the lower fat and therefore energy content of such donor breastmilk, rather than any unique property of human milk itself, accounted for their findings but concluded that this possibility was unlikely and that non-nutritive factors in breastmilk or dietary factors in breastmilk rather than the formulas used were responsible for the results observed.

A further study by Singhal et al., *Early nutrition and leptin concentrations in later life*, Am J Clin Nutr 2002; 75:993-9 (the disclosure of which is incorporated herein by reference) also involved preterm infants who participated in two trials. In trial 1 subjects received either a nutrient-enriched preterm formula (Farley's Osterprem; Farley Health Products (a division of H J Heinz Company Ltd, Stockley Park, Uxbridge, United Kingdom) or breast milk donated by unrelated lactating women, and in trial 2 subjects received either the same preterm formula or a standard term formula (Farley's Ostermilk; Crookes Health Care). The assigned diets were given until the infants weighed 2000 g or were discharged to their homes. Compared with the standard formula (15 g protein/L and 38 g fat/L), the preterm formula was enriched in protein and fat (20 g protein/L and 49 g fat/L) but not carbohydrate (70 g/L in both formulas). For infants fed banked donated milk, protein and energy intakes were estimated from 600 donor milk pools collected from multiple donors (~11 g protein, 20 g fat, and 70 g carbohydrate/L). The composition of the mothers' own expressed milk was measured in 4935 complete 24-h collections (~15 g protein, 30 g fat, and 70 g carbohydrate/L). The leptin concentration relative to fat mass was 30% greater in the children who received a preterm formula at birth than in those who received one of the two standard diets. This difference was independent of population differences at birth or in adolescence, and given the experimental design, strongly supported an influence of early diet on later leptin concentrations. The authors therefore concluded that infancy, at least in preterm infants, could be a critical window for programming later leptin physiology and by inference the risk of obesity. The authors averred that the novelty of their study lay in its experimental design, in which infants were randomly assigned at birth to receive diets with different nutrient compositions. Thus, controlling for possible confounding factors, they found that dietary manipulation for an average of only one month markedly influenced leptin concentrations relative to fat mass up to 16 years later. These differences were seen in a combined comparison between the nutrient-enriched and standard diets, in a comparison between the preterm formula and the term formula (trial 2), and in a comparison between the preterm formula and banked donated breast milk (trial 1), although the difference in the latter comparison was not significant. Their further observational analysis that showed an association between consumption of human milk (maternal plus banked breast milk) and lower leptin concentrations relative to fat mass was consistent with the hypothesis that leptin concentrations are programmable by early diet. It should be noted, however, that the "dietary manipulation" contemplated by the authors was randomly assigning infants to one diet or the other, but nothing beyond that.

A secondary analysis by Stettler et al., *Circulation*, 2005; 111:1897-1903 of a cohort study of healthy infants born between 1965 and 1978 in the region of Iowa City, Iowa, USA concluded that in formula fed infants weight gain during the first week of life may be a critical determinant for the development of obesity several decades later. Although there is a throw-away suggestion that the results might suggest new approaches to obesity prevention, no specific consideration is given to any such approach and there is no data to suggest that weight gain in the critical period can be controlled effectively to reduce or prevent long term obesity which may become apparent decades later. Moreover there is no disclosure or suggestion that changing the composition of modern formulas could be beneficial to long-term obesity risk i.e. risk of obesity from 6 months onwards and/or in childhood or adulthood. That this link was not made by the authors is further emphasized by their statement in the discussion that compared with breastfeeding, formula feeding has been associated with more rapid absolute weight gain in early infancy and with obesity in adolescence, but because their study was limited to exclusively formula-fed subjects, their finding cannot be explained by infant feeding mode. Therefore no link had been made between mode of early feeding and later obesity.

WO 2008/071667 (Haschke et al., Nestec S. A.) discloses a formula for infants at risk of developing obesity later in life which comprises a protein source, a lipid source and a carbohydrate source and has a protein content of less than 1.8 g/100 kcal and an energy density of less than 650 kcal/liter. In an embodiment the formula comprises 63 kcal/liter and 0.945 g/liter protein. The formula is intended for feeding to infants born to overweight or obese mothers from the age of three months and subsequently as part of a mixed diet during the introduction of solid foods until weaning is complete at the age of 12 months. No mention is made of the benefits of avoiding over-nutrition in the period immediately after birth e.g. in the two weeks after birth when the mother would be providing colostrum and transition milk and of the advantages flowing from avoidance of over-nutrition during that period.

SUMMARY OF THE INVENTION

We consider that formula-fed newborn infants might benefit from a feeding having a lower energy density, and perhaps more importantly, from a feeding that provides fewer calories during the initial weeks or months of life than would otherwise be provided from a feeding with a conventional infant formula. We have found from our long term infant studies that rapid early growth, achieved in large part from nutrient enriched feedings from conventional infant formulas, may result in long-term adverse health effects in individuals later in life, particularly with regard to long-term vascular health relevant to the development of atherosclerosis and to the later propensity to insulin resistance and non-insulin dependent diabetes mellitus (NIDDM), while slower growth in newborn infants, achieved in large part from feeding human milk or formula with a modified carbohydrate, fat and protein calorie distribution (e.g., higher protein, lower caloric density), can have a beneficial effect in the form of reduced occurrence of markers of adult morbidity.

In the infant studies described herein formula fed infants had a greater weight gain during the initial weeks of life than breastfed infants, and so it could be that the suggested long-term beneficial effects of breast-feeding on cardiovascular health could be a consequence of the lower nutrient intake of breastfed infants during this critical early window, e.g., the initial weeks or months of life.

In one aspect the invention provides a method for reducing the extent of or occurrence of long-term adverse health effects in human infants, comprising feeding to said infants when newborn a nutrient-containing formula providing not more than 1 gram of protein per 100 ml of formula and/or not more than 50 kcal per 100 ml of formula.

The present invention is also directed to a method of providing long-term health benefits in individuals by feeding methods directed to those individuals as newborn infants. These methods include a method of reducing the occurrence or extent of insulin resistance in an individual later in life, said method comprising the administration to an individual as a newborn infant the newborn infant formula of the present invention. These methods also include a method of reducing the occurrence or extent of atherosclerosis in an individual later in life, said method comprising the administration to an individual as a newborn infant the newborn infant formula of the present invention.

In another aspect, the invention provides a method for reducing the extent of or occurrence of long-term obesity in humans, comprising feeding to said humans when newborn infants a nutrient-containing-formula providing not more than 1 gram of protein per 100 ml of formula and/or not more than 50 kcal per 100 ml of formula.

Embodiments of the invention are also directed to a method of providing nutrition to newborn infants, said method comprising the administration of the newborn infant formulas of the present invention to newborn infants during the first two months of life, preferably during at least about the first or first and second weeks of life.

Embodiments of the invention give effect to an observed relationship between feeding and growth rates among newborn infants and certain biochemical markers suggestive of long-term health effects of those infants later in life. In particular, it has been observed that rapid growth rates of newborn infants appear to correlate with certain biochemical markers that are suggestive of an increased potential development of long-term adverse health effects in those infants later in life such as atherosclerosis or coronary artery disease and insulin resistance or non-insulin dependent diabetes. It now appears that a more controlled growth rate of newborn infants may result in long term health benefits. These controlled growth rates are made possible by administration of the infant formulas of the present invention in accordance with the corresponding methods described herein.

The infant feeding formula of the present invention may include those compositions comprising from 0.5 to 1.00 grams of protein per 100 ml of formula and/or 25 to 50 kilocalories per 100 ml of formula. These compositions include those in which the protein component is selected from bovine caseins, whey proteins and individual proteins thereof, alpha-casein, P-lactoglobulin, serum albumin, lactoferrin, immunoglobulins and combinations of these proteins and also mixtures with other proteins. In these embodiments, the infant feeding formulas may contain energy in the form of carbohydrate and fat. The present invention is also directed to a liquid infant feeding formula which comprises water and the above-described infant feeding formula.

The presently proposed protein content, energy density or combination thereof is much different than those found in conventional term and preterm infant formulas.

More particularly, the inventors have found that faster growth (upward centile crossing on growth charts) in infancy adversely programmes the metabolic syndrome. Consistent with this, faster neonatal growth (first two weeks of life) programmes insulin resistance and endothelial dysfunction which has a central role in the initiation and progression of atherosclerosis and can be measured non-invasively using vascular ultrasound as the vasodilatator response to increased blood flow—flow-mediated dilation, or FMD. The size of the effect is substantial. Adolescents with the greatest weight gain in the first 2 weeks of life show 4% lower FMD of the brachial artery than those with the lowest weight gain, an effect similar to that of insulin dependent diabetes mellitus (4%) and smoking (6%) in adults. Importantly, similar adverse effects on vascular health were observed for faster linear growth in the first few weeks of life. It has also been confirmed that programming effects of growth in infancy are not confined to infants born prematurely. For instance, in an intervention study of infants born full-term, but small for gestation, those randomly assigned to a standard formula for the first 9 months had lower blood pressure 6-8 years later than infants fed a nutrient-enriched formula that promoted growth. Further analysis suggested that faster growth explained the adverse effects of a nutrient-enriched formula on later blood pressure. Similar effects can be observed for adiposity: infants randomized to the high protein formula have greater adiposity later in life, an effect explained by their faster growth rate. Interestingly, the adverse effects of faster growth are seen in both breast-fed and formula-fed infants.

The inventors have therefore concluded that there is benefit in avoidance of over-nutrition associated with the use of modern formulas rather than colostrum and early breast-milk feeding very early in infancy in reducing the risk of cardiovascular disease and other adverse effects, and that there are advantages in providing new infant feeding formulae that mimic the pattern of avoidance of over-nutrition in breast-fed infants. This conclusion is counter-intuitive and is contrary to the consensus, or indeed mind-set within the industry, at the priority date of this application that the relatively rapid weight gain in formula fed infants is desirable or at least without adverse consequences. Thus it has been common practice to use enriched formulations to promote catch-up growth in small healthy full-term infants without recognition that this could be deleterious to their long term outcome. Furthermore, the volume of intake of milk is lower in breast-fed than formula-fed infants in the first week of life, and this is especially marked in the first few days which the inventors believe to be critical for long-term health. Therefore in order to achieve the same or similar nutrient intake for formula fed infants as for breast fed infants, the nutrient composition of the new formula should be lower to compensate for the higher volume of intake and mimic the growth pattern in a breast-fed infant. For example, providing a formula that mimics colostrum and feeding that formula in the first few days of life may not be best for the infant: since this would not account for the increased volume intake of the formula fed baby—this would be the case if hypothetically a formula-fed baby took 60 ml/kg per day which is commonly recommended whereas the same baby fed at the breast might have had an intake as low as 20 ml/kg/day.

Embodiments of the invention are supported by novel findings of the study described in Example 3 that:

(1). A low-nutrient formula, modeled to be closer to early breast-milk, can reduce the rate of weight gain of formula-fed infants in the first week and make weight gain more similar to that of a breast-fed infant. In fact, like the breast-fed group, infants fed the new lower-nutrient formula had weight loss in the first week rather than weight gain as seen in infants given conventional formula.

(2). In contrast to the current view held by nutritionists, the study shows for the first time, that formula-fed infants given a formula with a lower energy and protein concentration do not compensate by drinking a greater volume of intake. Thus, this study demonstrates, experimentally, the concept that reducing the energy and protein concentration of infant formula alone (i.e. without any attempts to affect volume of intake) can lower weight gain of formula-fed infants in the first week.

(3) The study confirms our concept that a more physiological growth pattern (closer to that of a breast-fed baby) can be achieved with a starter formula with nutritional composition in the range of 25-50 kcal/100 ml for energy and/or <1.0 g/100 ml for protein. Because the critical factors for weight gain in infancy are energy and protein intake, slower weight gain in formula-fed infants can be achieved by a formula with lower energy and/or lower protein in any combination.

(4) Because infants fed the lower nutrient formula did not compensate by drinking more, this study demonstrates for the first time that it is possible to reduce energy and protein intake of formula-fed babies to make them closer to a breast-fed infant in the first week (FIG. 2). FIG. 2b suggests that to more closely match breast-fed infants, a further reduction in protein concentration is desirable (this could be achieved by reducing the protein concentration of the trial formula for days 3-7 to <1.0 g/100 ml rather than the current 1.3 g/100 ml). Such a reduction in protein will help to more closely match the rate of weight gain in infants given a starter formula to that of breast-fed infants.

(5) The new lower-nutrient formula regime was safe and well tolerated.

(6) The study supports our hypothesis that the first week of life is a critical window for longer-term effects. Given the increasing evidence for the first week as sensitive window for long-term programming effects in both animals and humans, this study strongly supports the hypothesis that the beneficial effects of breast-feeding versus formula-feeding on long-term risk of obesity and cardiovascular disease may be related to differences in weight gain in the first week(s) after birth.

(7) The study strongly supports the hypothesis that manipulating growth in early life could reduce the later risk of obesity. As in animal models, diet affected growth very early in the post-natal period and this difference was maintained (or increased) later in infancy. In fact the differences in weight between randomized formula-fed groups tended to amplify with age. As a consequence, weight at age 28 days and 6 months, well beyond the brief intervention period, was lower in infants given the new formula than controls, independent of potential confounding factors. Importantly, compared to controls, infants given the lower nutrient formula had lower skinfold thickness at age 28 days suggesting that manipulation of early diet had later effects on fat deposition as shown in animal models. This finding supports the hypothesis that the new formula will help combat the greater risk of obesity associated with formula-feeding compared to breast-feeding.

(8) Uniquely, because of the experimental (randomized) study design, this study establishes a causal basis in humans for the considerable epidemiological (observational) evidence that links early growth and nutrition to later risk of obesity. Lower weight gain in the first week was associated with lower weight at age 6 months even after adjustment for length and potential confounding factors (sex and birth weight z score a measure of size at birth). While the mechanism for this effect is unknown, there is evidence in animal models which suggests that a slower pattern of weight gain very early in infancy may programmer a lower set point for appetite.

(9) The lower nutrient starter formula resulted in lower weight at age six months. Based on extensive published evidence epidemiological evidence, this slower weight gain would be expected to have long-term beneficial effects on obesity and CVD risk (including blood pressure, insulin resistance and diabetes risk, and atherosclerosis).

(10) These data raise the prospect of primary prevention of obesity and CVD beginning in infancy and strongly suggest the desirability of introducing new low energy density and/or low protein formula for use in the first week or two of life.

BRIEF DESCRIPTION OF THE DRAWINGS

The invention is illustrated by the accompanying drawings in which.

DETAILED DESCRIPTION OF THE INVENTION

Figure 1:
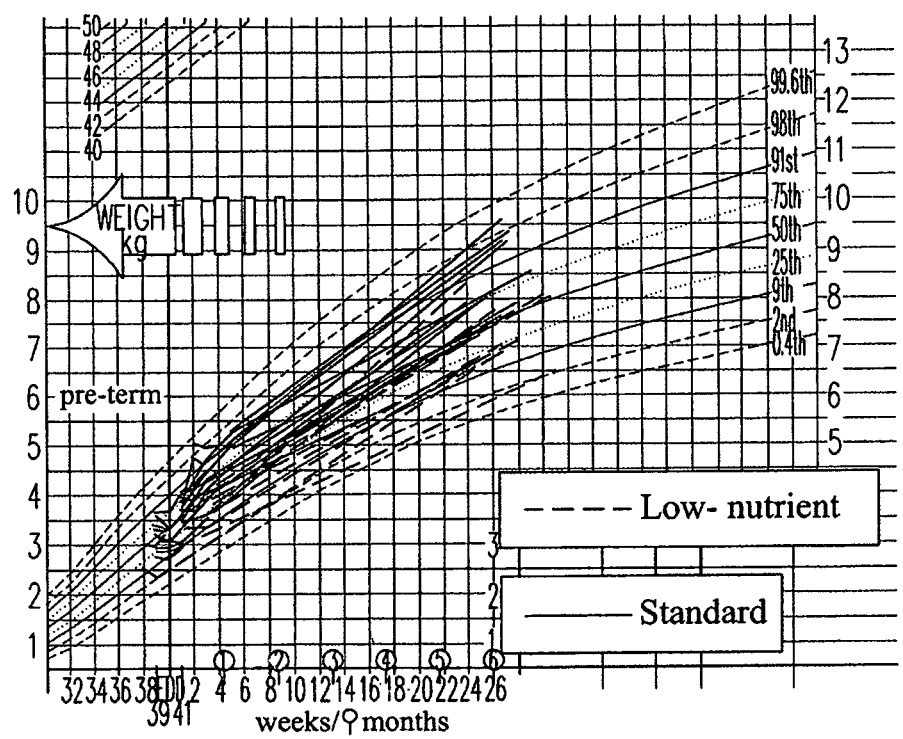
FIG. 1 is a graph showing weight against time from birth for female infants given standard formula and lower nutrient starter formula in a study reported in Example 3.

The newborn infant formula and methods of the present invention are directed to the formulation and use of defined amounts of macronutrients, i.e., protein, carbohydrate, and fat, and energy in newborn infants. These and other essential or optional characteristics or components of the formulation and methods of the present invention are described in greater detail hereinafter.

The term "newborn infant" as used herein, unless otherwise specified, means term infants less than about 3 months of age, including infants from zero to about 2 weeks of age. As used herein, a "term infant" refers to individuals born at or beyond 37 weeks gestation, unless otherwise specified.

The terms "fat" and "lipid" are used interchangeably herein, and unless otherwise specified, refer generally to fats, oils, and combinations thereof.

The terms "infant formula" and "nutritional formula" are used interchangeably herein and refer to nutritional compositions designed for infants, which preferably contain sufficient protein, carbohydrate, lipid, vitamins, minerals, and electrolytes to potentially serve as the sole source of nutrition when provided in sufficient quantities. These terms refer to synthetic nutritional formulas and therefore specifically exclude human milk, cows milk, or any other natural whole milk product, except when such natural whole milk product is modified by manufacturing processes to form a modified milk product, e.g., milk-based infant formula.

All percentages, parts and ratios as used herein are by weight of the total composition, unless otherwise specified.

All such weights as they pertain to listed ingredients are based upon the active level and, therefore, do not include solvents or by-products that may be included in commercially available materials, unless otherwise specified.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

Numerical ranges as used herein are also intended to include the term "about" to modify the numerical end points of each range.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The compositions and methods of the present invention can comprise, consist of, or consist essentially of the essential elements and limitations of the invention described herein, as well as any additional or optional ingredients, components, or limitations described herein or otherwise useful in nutritional infant formula applications.

Energy

Embodiments of the newborn infant formulas of the present invention have low energy content relative to conventional term and preterm infant formulas, wherein these newborn infant formulas comprise or otherwise provide a caloric density of from about 25 to about 50 kcal per 100 ml, including from about 35 to about 45 kcal per 100 ml, also including from about 37 to about 42 kcal per 100 ml. The caloric density of the newborn infant formulas of the present invention are easily distinguished from that of conventional term and preterm infant formulas, wherein such conventional formulas typically have a caloric density or energy content of from 66 to 88 kcal per 100 ml (i.e., 19-25 kcal/fl oz).

When the newborn infant formulas of the present invention are in powder form, then the powder is intended for reconstitution prior to use to obtain the above-noted caloric densities and other nutrient requirements. Likewise, when the infant formulas of the present invention are in a concentrated liquid form, then the concentrate is intended for dilution prior to use to obtain the requisite caloric densities and nutrient requirements. The newborn infant formulas can also be formulated as ready-to-feed liquids already having the requisite caloric densities and nutrient requirements. The newborn infant formulas of the present invention are preferably administered to newborn infants in accordance with the methods described herein. Such methods may include feedings with the newborn infant formulas in accordance with the daily formula intake volumes described hereinafter.

Protein

Embodiments of the newborn infant formulas of the present invention comprise protein in the requisite amounts as described hereinbefore relative to the total energy content of the formula. Any known or otherwise suitable protein or protein source may be used in the newborn infant formulas of the present invention, provided that such proteins are suitable for feeding infants, especially newborn infants.

Proteins or protein sources for use in the infant formulas of the present invention may include intact or non-hydrolyzed protein, hydrolyzed protein, partially hydrolyzed protein, free amino acids, and combinations thereof, which protein or protein source may be derived from any known or otherwise suitable source such as milk (e.g., casein, whey, milk protein isolates), animal (e.g., meat, fish), cereal (e.g., rice, corn), vegetable (e.g., soy), or combinations thereof. The protein can include, or be entirely or partially replaced by, free amino acids which are known or otherwise suitable for use in nutritional products, non-limiting examples of which include L-alanine. L-arginine. L-asparagine. L-aspartic acid, L-carnitine, L-cystine. L-glutamic acid, L-glutamine, glycine. L-histidine, L-isoleucine, L-leucine. L-lysine, L-methionine, L-phenylalanine, L-proline. L-serine. L-taurine. L-threonine, L-tryptophan. L-tyrosine, L-valine, and combinations thereof.

Other Nutrients

The newborn infant formulas of the present invention comprise fat and carbohydrate nutrients in addition to the protein nutrients described hereinbefore, and should further comprise still other nutrients such as vitamins, minerals, and combinations thereof, of sufficient types and amounts to help meet the special nutritional needs of the newborn infant. The newborn infant formulas may be used as the sole source of nutrition during the initial weeks or months of life, and can be used in combination with human milk during that same period.

The newborn infant formulas comprise a fat or lipid component. Non-limiting examples of fats suitable for use in the newborn infant formulas include coconut oil, soy oil, corn oil, olive oil, safflower oil, high oleic safflower oil, MCT oil (medium chain triglycerides), sunflower oil, high oleic sunflower oil, structured triglycerides, palm and palm kernel oils, palm olein, canola oil, marine oils, cottonseed oils, and combinations thereof.

The newborn infant formulas of the present invention also comprise carbohydrates. Non-limiting examples of suitable carbohydrates or carbohydrate sources include hydrolyzed or intact, naturally and/or chemically modified, starches sourced from corn, tapioca, rice or potato, in waxy or non-waxy forms. Other non-limiting examples of suitable carbohydrates or carbohydrate sources include hydrolyzed cornstarch, maltodextrin (i.e. non-sweet, nutritive polysaccharide having a DE value less than 20), glucose polymers, sucrose, corn syrup, corn syrup solids (i.e., polysaccharide having a DE value greater than 20), glucose, rice syrup, fructose, high fructose corn syrup, indigestible oligosaccharides such as fructooligosaccharides (FOS), and combinations thereof. The carbohydrates can comprise lactose or can be substantially free of lactose. The newborn infant formulas may further comprise any of a variety of vitamins, non-limiting examples of which include vitamin A, vitamin D, vitamin E, vitamin K, thiamine, riboflavin, pyridoxine, vitamin B 12, niacin, folic acid, pantothenic acid, biotin, vitamin C, choline, inositol, salts and derivatives thereof, and combinations thereof.

Product Form

The newborn infant formulas of the present invention can be prepared in any of a variety of product forms, but will most typically be in the form of a ready-to-feed liquid, a liquid concentrate for dilution prior to consumption, or a powder that is reconstituted prior to consumption.

Method of Use

The present invention is also directed to a method of providing nutrition to a newborn infant, said method comprising the administration or feeding to a newborn infant the newborn infant formula of the present invention. Such methods include the daily administration of the newborn infant formulas, including administration at the daily intake volumes and relative daily macronutrient intakes, as described hereinbefore.

Such methods therefore include the daily administration to a newborn infant a formula having a caloric density of from about 25 to 50 kcal per 100 ml. including from about 35 to about 45 kcal per 100 ml, also including from about 37.5 kcal per 100 ml to about 42.5 kcal per 100 ml.

The methods of the present invention may further comprise average feeding volumes as described herein, wherein the newborn infants are provided increasing formula volumes during the initial weeks of life. Such volumes most typically range up to about 100 ml/day on average during the first day or so of life; up to about 200 to about 700 ml/day, including from about 200 to about 600 ml/day, and also including from about 250 to 500 ml/day, on average during the first two weeks; and thereafter up to about 1100 ml/day, including from about 600 to about 1100 ml/day, and also including from about 800 to about 1000 ml/day, on average during the remainder of the 3 month newborn feeding period. It is understood, however, that such volumes can vary considerably depending upon the particular newborn infant and their unique nutritional needs during the initial weeks or months of life, as well as the specific nutrients and caloric density of the formulated newborn infant formula.

The present invention is also directed to a method of reducing the extent or occurrence of insulin resistance in an individual later in life, said method comprising the administration to an individual as a newborn infant the newborn infant formula described herein, all in accordance with the above-described method. In the context of the present invention, the term "later in life" refers to the phase in an individuals life beyond the newborn infant stage.

The present invention is also directed to a method of reducing the extent or occurrence of atherosclerosis or coronary artery disease in an individual later in life, said method comprising the administration to an individual as a newborn infant the newborn infant formula described herein, all in accordance with the above-described methods.

The present invention is further directed to a method of reducing the extent or occurrence of obesity in an individual in later life, said method comprising the administration to an individual as a newborn infant the newborn infant formula described herein, all in accordance with the above-described methods.

In the context of the methods of the present invention as applied to newborn infant formulas in powder form, the corresponding method may further comprise reconstituting the powder with an aqueous vehicle, most typically water or human milk, to form the desired caloric density, which is then orally or enterally fed to the newborn infant to provide the desired nutrition. For powdered newborn infant formula embodiments of the present invention, each is reconstituted with a sufficient quantity of water or other suitable fluid such as human milk to produce the desired caloric density, as well as the desired feeding volume suitable for one infant feeding.

The newborn infant formulas of the present invention may be prepared by any known or otherwise effective technique suitable for making and formulating infant or similar other nutritional formulas. Many such methods are described in the relevant arts or are otherwise well known to those skilled in the nutrition formula art, and are easily reapplied by one of ordinary skill in the formulation arts to the newborn infant formulas of the present invention.

The newborn infant formulas of the present invention, including the exemplified formulas described hereinafter, can be prepared by any of a variety of known or otherwise effective methods. These methods most typically involve the initial formation of an aqueous slurry containing carbohydrates, proteins, lipids, stabilizers or other formulation aids, vitamins, minerals, or combinations thereof. The slurry is emulsified, pasteurized, homogenized, and cooled. Various other solutions, mixtures, or other materials may be added to the resulting emulsion before, during, or after further processing. This emulsion can then be further diluted, heat-treated, and packaged to form a ready-to-feed or concentrated liquid, or it can be heat-treated and subsequently processed and packaged as a reconstitutable powder, e.g., spray dried, dry mixed, agglomerated.

The formulas of the present invention which provide not more than 1 gram of protein per 100 ml of formula or not more than 50 kcal per 100 ml of formula or both not more than 1 gram of protein per 100 ml of formula and not more than 50 kcal per 100 ml of formula may be prepared by conventional manufacturing methods, using conventional fat (e.g., blend of high oleic sunflower, coconut and soy oil), carbohydrate (e.g., blend of lactose, maltodextrin, and corn syrup), protein (e.g., milk protein isolate or soy protein isolate), minerals, vitamins, and other common ingredients, to achieve the targeted nutrition profile.

The above described formulas may then fed to newborn infants, or otherwise diluted or reconstituted prior to such feeding, in accordance with the methods of the present invention, wherein such feeding is administered by a conventional infant formula bottle at a daily average volume of from about 150 ml/day to about 900 ml/day on average during the first two weeks of life, and from 300 to about 1200 ml/day on average during the remaining first 3 months of life.

The effects of avoiding early over-nutrition on long-term health in controlled comparison groups in the human population was determined and the results are shown in the Examples.

Example 1

Subjects were part of a cohort of 926 who were born preterm and participated in studies that investigated the effects of early diet on later cognitive function and cardiovascular disease. Between 1982 and 1985, babies free from major congenital anomalies and below 1850 g in birthweight were recruited in 5 centres (Norwich, Cambridge, Sheffield, Ipswich and King's Lynn). A reference group of subjects of the same age, but born at term and with birthweight above the $10^{th}$ centile, was also recruited from schools in the same communities as those born preterm.

Infants born preterm were randomly assigned, in two parallel randomized trials, to different diets at birth. These trials compared a nutrient enriched preterm formula (Farley's Osterprem, Farley's Health Care, a division of H J Heinz Company, Ltd, Stockley Park, Uxbridge, UK) versus the relatively low nutrient diets available at the time. In trial 1 the preterm formula was compared versus banked breast milk donated by unrelated lactating women and in trial 2 the same preterm formula was compared against a standard term formula (Farley's Ostermilk). Within each trial (1 and 2) the diets were randomly assigned in two strata: A) the trial as diets alone and B) in mothers who elected to express their own milk; the trial diets were assigned as supplements to mother's milk (see Table 1). To compare the nutrient enriched preterm formula versus the lower nutrient diets, as originally planned, trials 1 and 2 (and strata A and B within each trial) have been combined as a balanced addition, thereby preserving randomization. Random assignment to diets occurred within 48 hours of birth using sealed envelopes. Ethical approval for the trial was obtained from each centre and informed consent obtained from each parent (no parent refused consent).

The assigned diets were given until the infant weighed 2000 g or was discharged home. Compared with standard term formula, preterm formula was enriched in protein and fat (2.0 g protein and 4.9 g fat per 100 ml preterm formula compared to 1.5 g protein and 3.8 g fat per 100 ml of term formula) but not carbohydrate (7.0 g/100 ml) in both formulas. Preterm formula was also enriched in vitamins, zinc and copper. For infants fed banked donated milk, protein and energy intakes were estimated from 600 donor milk pools collected from multiple donors (approximately 11 g protein, 2 g fat and 7 g carbohydrate per 100 ml). Mother's own expressed milk composition was measured in 4935 complete 24-hour collections (approximately 5 g protein, 3 g fat, and 7 g carbohydrate).

Extensive demographic, social, anthropometric, biochemical and clinical data were collected throughout the hospital admission. Infants were weighed daily by trained staff and a mean weight for each week postnatally was calculated to reduce inaccuracies arising from daily fluctuations in weight. Weights were also available at discharge from the neonatal unit, at age 18 months, 9-12 and 13-16 years. Social class was based on the occupation of the parent providing the main financial support for the family (or if both parents worked the father's occupation) according to the Registrar Generals Classification as described.

Follow-up

The present follow-up at age 13-16 years involved measurement of 4 key variables (blood pressure, flow-mediated endothelial dependent dilation, lipid profile and 32-33 split insulin concentrations (as a measure of insulin resistance-see example 2). Sample size was estimated to exclude a half standard deviation (0.5 D) difference in outcomes between randomized dietary groups in each of the two trials. We required a maximum sub-sample of around 250 subjects from our original cohort to detect this difference (with two parallel trials) at 80% power and 5% significance; and a minimum sample of around 200 subjects for 70% power and 5% significance.

FMD Measurement

We measured brachial artery Flow-Mediated endothelial dependent Dilation (FMD), an indicator of endothelial dysfunction relevant to the atherosclerotic process in a population subject to avoidance of neonatal over-nutrition and in healthy controls. This was determined by researchers who were unaware of the subject's gestational age. Subjects were rested supine for 10 minutes prior to the ultrasound scan, which was conducted by a single observer in a temperature controlled (22-24° C.), darkened room, between 0900-1300. The brachial artery was imaged in longitudinal section, 5-10 cm above the elbow, using a 7 MHz linear array transducer and an Acuson 128XP/10 system. The transducer was then fixed using a stereotactic clamp and fine position adjustments made when necessary using micrometer screws. A pneumatic cuff was inflated around the forearm to 300 mm Hg for 5 minutes followed by rapid deflation causing a large increase in blood flow (reactive hyperaemia). The resting and post-hyperaemic blood flow velocities in the centre of the imaged artery were determined using pulsed Doppler. End diastolic B-mode images were randomized and stored off-line sequentially every 3 seconds throughout the scan procedure for arterial diameter measurements immediately after the scan procedure (for 1 minute resting, 5 minutes cuff inflation and 3 minutes post cuff deflation). Blood pressure was monitored using an automated oscillometric device (Accutorr, Datascope Corp. New Jersey) and heart rate recorded using a three-lead electrocardiogram (ECG) linked to the ultrasound machine. The reproducibility and detailed methodology for measuring FMD has been previously described. FMD was expressed as the absolute maximal change between pre- and post-hyperaemic brachial artery diameter adjusted for prehyperaemic diameter (using regression analysis) and as the absolute change in diameter expressed as a percentage of pre-hyperaemic diameter (FMD %).

Anthropometry and Biochemistry at Follow-up

Height was measured using a portable stadiometer accurate to 1 mm (Holtain Instruments Ltd., Crymmych, UK) and weight using electronic scales accurate to 0.1 kg (Seca, Hamburg, Germany). Measurements were made using standard protocols by one of two observers trained in the techniques involved. Tanner staging was performed in private by self-assessment using standard Tanner stage photographs. Social class was based on the occupation of the parent providing the main financial support for the family (or if both parents worked the father's occupation) according to the Registrar General's Classification.

Blood was obtained by venepuncture between 09.00 and 11.00 after an overnight fast. Plasma was separated immediately, stored initially at −20° C. and then at −80° C., and thawed only once immediately before analysis. Plasma concentrations of LDL cholesterol were determined using standard laboratory methods.

Statistical Analysis

Multiple linear regression analyses were used to assess associations between the rate of neonatal and childhood growth (weight gain) and later FMD. Neonatal weight gain was expressed as the absolute value and as the standard deviation score from expected weight (z score) using centiles for infants born preterm. Growth beyond the neonatal period was calculated as the change in z score for weight between discharge and age 18 months, 18 months and 9-12 years, and 9-12 and 13-16 years. All regression analyses were adjusted for potential confounding factors (age, sex, neonatal morbidity—number of days in >30% oxygen and the number of days of ventilation and social class, and for height, weight, serum LDL cholesterol concentration at follow-up, and room temperature). To compare the influence of the early growth on later FMD in adolescents born preterm with term subjects, the preterm population was divided into 2 groups by their early growth (median for weight gain in the first 2 postnatal weeks). Mean FMD in these two groups was compared with control subjects born at term using analysis of variance and p values were adjusted for multiple comparisons using Bonferroni's corrections. Statistical significance was taken as p<0.05 for all analyses.

Results

Subjects reviewed at age 13-16 years were representative of those recruited at birth in terms of birthweight, gestation, birthweight z score, discharge weight z score, social class and neonatal morbidity. There were no statistically significant differences in mean FMD between randomized dietary groups and this justifies combining all feed groups in the analyses below. Some background characteristics of subjects are given in Table 1a.

Birthweight for Gestation and Later FMD

FMD was significantly related to birthweight z score and this association remained significant after adjustment for potential confounding factors (age, sex, height, weight, fasting LDL concentrations, room temperature, social class and neonatal morbidity expressed as the number of days of ventilation or days in >30% oxygen) (Table 2).

Birthweight for Gestation and Early Postnatal Growth

As expected, a low birthweight z score was associated with greater weight gain from birth to the second week postnatally (regression coefficient=−51.6 g per z score increase in birthweight; 95% CI: −61.6 to −41.5 g; P<0.001), and from birth to discharge (median age 4.4 weeks) (regression coefficient=−75.1 g per z score increase in birthweight; 95% CI: −114.9 to −35.3 g; P<0.001). These associations remained significant after adjustment for gestation, sex, neonatal morbidity (as above), social class or dietary group (standard versus nutrient enriched diet) (data not presented).

Postnatal Growth and Later FMD

Subjects who showed weight gain in the first 2 weeks of life had lower FMD % in adolescence (mean, SD: 5.5%, 2.6%; n=65) than those who had early weight loss (7.1%, 3.5%, n=137; 95% CI for difference=−2.4% to 0.7%; p<0.001). Similar significant results were obtained after adjustment for birthweight and gestation (p=0.01) (data not presented), or after the analysis was confined to subjects without intrauterine growth retardation (weight above the $10^{th}$ centile for gestation) or to subjects with birthweight above the mean for the population (1.4 kg) (data not presented). A greater neonatal growth rate (expressed as the change in z score for weight between birth and discharge or between birth and age 4 weeks) was associated with lower FMD in adolescence and these associations remained significant after adjustment for potential confounding factors (as above) (Table 2). In contrast, growth expressed as the change in z score for weight between discharge and age 18 months, 18 months and 9-12 years, or between 9-12 and 13-16 years was not related to later FMD (Table 2).

To better define the period of neonatal growth that influenced later FMD, the period between birth and discharge was divided into two (between birth and the second week and between the second week and discharge). A greater growth rate between birth and the second week, but not between the second week and discharge, was associated with lower FMD in adolescence and this association remained significant after adjustment for potential confounding factors (as above) (Table 2). Similarly, greater weight gain in the first 2 weeks postnatally was associated with lower FMD in adolescence (Table 1a) independent of birthweight, gestation and possible confounding factors (as above) (Table 2).

To exclude the possibility that postnatal weight loss due to fluid shifts rather than postnatal weight gain influenced later FMD, two further analyses were performed. First, we assessed the association of weight gain between the minimum weight after birth and the weight in the second week with later FMD. Greater weight gain during this period was associated with lower FMD in adolescence independent of birthweight, gestation and potential confounding factors (see above) (Table 2), Second, greater length gain between birth and the second week, unlikely to be related to postnatal fluid loss, was associated with lower FMD in adolescence independent of birthweight, gestation and potential confounding factors (Table 2).

Early Postnatal Growth and Later FMD: Group Comparisons

Figure 2A:
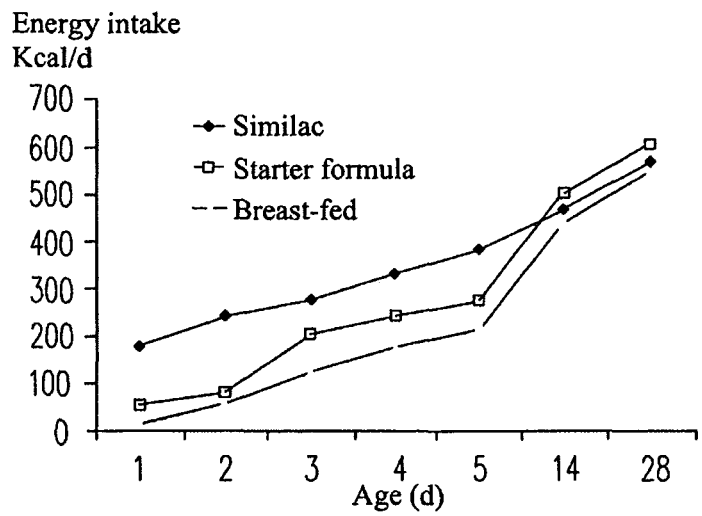
FIGS. 2a and 2b are graphs of energy and protein intake against time from birth for infants randomized to lower-nutrient (starter formula) or standard formula (Similac), data for breast-fed infants being calculated from published values of breast-milk composition and volume intake in the study of Example 3.
Figure 2B:
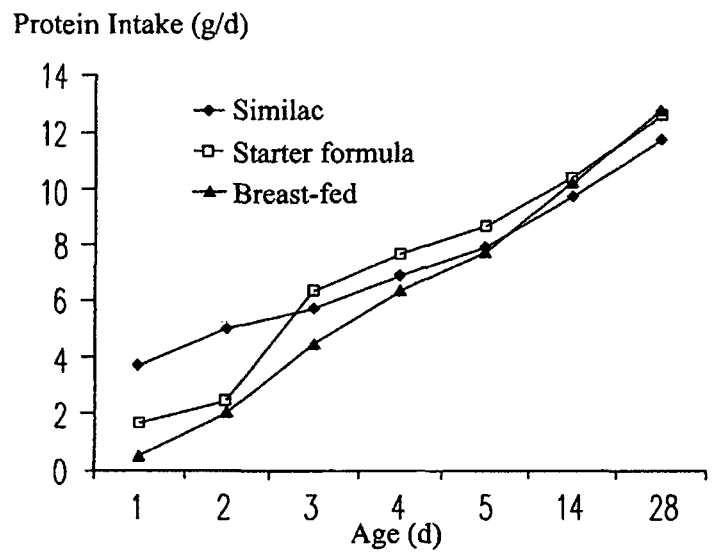

Mean FMD was greater in adolescents born preterm with weight gain in the first 2 postnatal weeks below the population median (−51.0 g) (mean: 7.4%; SD: 3.4%) than those with weight gain above the median (mean; 5.7%, SD: 2.9%; p<0.001) or control subjects born at term (mean 6.1%; SD 2.8%; p=0.027) (FIG. 2). However, mean FMD in preterm subjects with early weight gain above the population median did not significantly differ from control subjects born at term.

Relative Contribution of Intra-uterine and Early Postnatal Growth to Later FMD There was no significant interaction between birthweight z score and weight change from birth to the second week on later FMD (p=0.56). All measures of postnatal growth (as shown in Table 2), potential confounding factors (as above), and birthweight z score were included in a stepwise multiple regression model. Only the change in weight between birth and the second week, and room temperature were statistically significantly related to later FMD (regression coefficients=−0.027 mm change per 100 g weight increase; 95% CI: −0.042 to −0.012 mm; p=0.001; and 0.009 mm change per 1° C. rise in room temperature; 95% CI: 0.002 to 0.016 mm; p=0.009).

A greater rate of weight gain during a critical window in the first two weeks after birth was associated with endothelial dysfunction up to 16 years later. Our data indicates in humans that rapid growth immediately after birth has adverse consequences later in life. FMD was greater in preterm infants who had a slower rate of growth than in those with the greatest growth, or, importantly, in control subjects born at term (FMD in these latter two groups did not significantly differ). Therefore our findings now show that growth impairment during a brief window after birth may have long-term benefits to health. Our data shows that improvement in some aspects of long-term health can be achieved by avoidance of early over-nutrition. The first 2 weeks after birth appeared to be the sensitive period. Adolescents with the greatest weight gain during this period had 4.0% lower FMD than those with the lowest weight gain; a substantial effect on FMD, similar to that of insulin dependent diabetes (4%) and smoking (6%) in adults.

Example 2

The Effect of Avoidance of Over-Nutrition on Insulin Resistance

The subjects were the same as in Example 1 and subjected to the same regime and trials and 32-33 split insulin concentrations (as a measure of insulin resistance was measured).

Sample size was estimated to exclude half a standard deviation in outcomes between randomized dietary groups in each of the trials and we required a maximum subsample of around 250 subjects from our original cohort to detect this difference (with two parallel trials) at 80% power and 5% significance; and a minimum sample of around 200 subjects for 70% power and 5% significance. A subset of 216 subjects, which met our minimum criteria, agreed to participate at our initial attempt at recruitment and was found to be representative of the original population. For comparison of a nutrient enhanced versus standard neonatal diet (trials 1 and 2 combined) this sample was sufficient to detect a 0.4 SD difference in fasting 32-33 split proinsulin concentration between randomized groups with 80% power and at 5% significance. Ethical approval for the follow-up study was obtained from national and local research ethics committees and written consent was obtained from all children, parents and their guardians.

Biochemistry

Blood was obtained by venepuncture between 09.00 and 11.00 after an overnight fast. Plasma was separated immediately, stored initially at −20° C. and then at −80° C., and thawed only once immediately before analysis. Glucose concentration was measured using ahexokinase method. 32-33 split proinsulin, intact proinsulin and insulin concentrations were measured in the laboratories of Professor Hales in Cambridge. Insulin concentration was measured using a one step chemiluminescent immunoenzymatic assay. Cross-reactivity with intact proinsulin was less than 0.2% at 400 pmol/L and with 32-33 split proinsulin, less than 1% at 400 pmol/L. Intact proinsulin and 32-33 split proinsulin concentrations were assayed using a time resolved fluorometric assay (Delfia). The solid phase antibody, bound to a microtitre plate, was the same in each case. The labeled antibody used in the 32-33 split proinsulin assay was donated by Dako Diagnostics Ltd., Intact proinsulin was supplied by the National Institute for Biological Standards and Controls (1st International Reagent 84/611), and purified 32-33 split proinsulin donated by Lilly Research Labs. The antibodies were labeled with Europium using the Delfia Europium labeling kit 1244-302 (Wallac, UK Ltd). The intact proinsulin assay typically shows less than 1% cross-reactivity with insulin and 32-33 split proinsulin at 2500 pmol/L and 400 pmol/L respectively. The 32-33 split proinsulin assay shows less than 1% cross-reactivity with insulin at 2500 pmol/L.

Statistical Analysis

The principal outcome was 32-33 split proinsulin concentration. Comparisons of normally distributed variables between randomized groups were made with Student's t test. Simultaneous multiple linear regression analyses were used to adjust differences between randomized groups for possible baseline differences. Infants born preterm and randomized to the lower nutrient diet were compared to adolescents born at term using Student's t test.

Multiple linear regression analyses were used to assess associations between the rate of neonatal and childhood growth (weight gain) and later insulin concentrations. Neonatal weight gain was expressed as the absolute value and as the standard deviation score from expected weight (z score) using centiles for infants born preterm. Growth beyond the neonatal period was calculated as the change in z score for weight between discharge and age 18 months, 18 months and 9-12 years, and 9-12 and 13-16 years. Current body mass index (BMI) was expressed as the standard deviation score from expected BMI (z score) using national reference centiles. The distributions of 32-33 split proinsulin, proinsulin, and insulin concentrations were log transformed and then multiplied by 100. Therefore the log standard deviation multiplied by 100 represented the coefficient of variation and the coefficient in regression analyses represented the mean percentage change in insulin concentration per unit change in independent variable. Regression analyses were adjusted for potential confounding factors (sex, age, and BMI z score at current follow-up and neonatal morbidity-number of days in >30% oxygen and the number of days of ventilation—and social class at birth). Statistical significance was taken asp <0.05 for all significance tests, which were two tailed.

Results

Analyses in Adolescents Born Preterm

Subject Characteristics: There were no statistically significant differences in birthweight, gestation, standard deviation scores for birth and discharge weight, and clinical parameters between children who were or were not reviewed at age 13-16 years (Table 1). As expected, the percentage of adolescents from a non-manual social background was greater at follow-up than at birth for both trials (Table 1). However, there were no significant differences in neonatal characteristics, anthropometry, Tanner stage (median 4, inter-quartile range: 4-5), or social class between randomized dietary groups at follow-up (Table 3).

Main Effect: Comparison Between Randomised Dietary Groups

As planned, adolescents born preterm and randomized to a nutrient enriched diet (preterm formula) were compared with those randomized to the lower nutrient diet (banked breast milk or standard term formula). Fasting 32-33 split proinsulin (but not intact proinsulin, insulin or glucose concentration) was greater in adolescents randomized to the nutrient enriched diet than those randomized to one of the two lower nutrient diets (Table 4). The effect sizes were similar in adolescents randomized to preterm formula compared to banked breast milk (trial 1), or preterm formula versus term formula (trial 2) (Table 4) as evidenced by the lack of a significant diet by trial interaction for later 32-33 split proinsulin concentration (p=0.5), intact proinsulin (p=0.3) and insulin concentration (p=0.8). This further justifies combining trials 1 and 2. There was no sex difference in the effect of diet on fasting 32-33 split proinsulin concentration (the interaction between diet and sex on fasting 32-33 split proinsulin concentrations was not statistically significant; p=0.07).

In an explanatory analyses, the effect of diet on 32-33 split proinsulin concentrations remained significant after adjustment for birthweight and gestation, and potential confounding factors (see statistical methods above) (regression coefficient=18.4%; 95% CI of difference: 3.5% to 33.2%; p=0.016).

In the subsequent analyses only 32-33 split and intact proinsulin, but not insulin or glucose concentrations were significantly related to the early factors of interest (other data are not presented).

Effect of Early Postnatal Growth Programme Later Proinsulin Concentrations Because diet has a major influence on neonatal growth (see Table 3) we tested the hypothesis that postnatal growth programmed later 32-33 split and intact proinsulin concentrations. This was done in two ways: taking early postnatal growth as a continuous variable or as a dichotomous variable.

A greater neonatal growth rate (expressed as a continuous variable: the change in z score for weight between birth and discharge) was associated with higher fasting 32-33 split proinsulin and intact proinsulin in adolescence independent of birthweight, gestation and potential confounding factors (see statistical methods above) (Table 5). To better define the period of neonatal growth that influenced later proinsulin concentrations the period between birth and discharge was divided into two (between birth and the second week, and between the second week and discharge). Only growth in the first 2 weeks was associated with higher fasting 32-33 split and intact proinsulin concentrations in adolescence (Table 5).

Neonatal growth was taken as a dichotomous variable by comparing subjects who showed weight gain in the first 2 weeks of life (n=60) with those who had weight loss. Fasting 32-33 split proinsulin concentration was greater in subjects with early neonatal weight gain (geometric mean: 7.6 pmol/L, Coefficient of Variation, CV: 60%) compared to those with weight loss (5.9 pmol/L, CV: 54%; mean difference: 24%; 95% CI for difference=6.6% to 41.5%; p=0.007). Similar results were obtained for intact proinsulin (p=0.0003) (data not shown). The differences in 32-33 split proinsulin or intact proinsulin concentrations between neonatal weight gain groups remained significant after adjustment for birthweight and gestation (p=0.02 for 32-33 split proinsulin and p=0.03 for intact proinsulin).

To exclude the possibility that postnatal weight loss due to fluid shifts rather than postnatal weight gain influenced later fasting insulin concentrations, we assessed the association of weight gain between the minimum weight after birth and the weight in the second week with later proinsulin concentrations. Greater weight gain during this period was associated with higher 32-33 split and intact proinsulin concentration in adolescence independent of birthweight, gestation and potential confounding factors (as above) (Table 5).

To assess the influence of postnatal growth beyond the neonatal period on later proinsulin concentrations, growth was expressed as the change in z score for weight between discharge and age 18 months, 18 months and 9-12 years, or between 9-12 and 13-16 years. These variables were not significantly related to later, 32-33 split or intact proinsulin concentrations. Furthermore more rapid growth in the first 2 weeks postnatally was associated with greater 32-33 split proinsulin concentration in adolescence, with or without adjustment for current BMI z score (data not presented). Thus the influence of early growth on later 32-33 split proinsulin concentration was independent of weight gain during childhood.

Effect of Antenatal Growth Programme Proinsulin Concentrations

To explore the influence of antenatal growth we assessed the associations between birthweight for gestation and later proinsulin concentrations. Only fasting proinsulin (but not 32-33 split proinsulin) concentration in adolescence was negatively associated with birthweight z score independent of potential confounding factors (as above) (Table 5). Our prospective experimental study was designed to assess the influence of early nutrition on later cardiovascular risk factors. We found that adolescents born preterm who were randomized to a lower nutrient diet, now randomized as suboptimal in terms of growth, had lower fasting 32-33 split proinsulin concentration, a marker of insulin resistance, than those randomized to a nutrient rich diet. Further analysis suggested that these dietary effects, seen up to 16 years after dietary randomization were likely to operate by influencing neonatal growth rate. We suggest therefore that a reduced early growth rate as a consequence of avoidance of over-nutrition programmes a lower insulin resistance and, by inference, a lower propensity to NIDDM.

Example 3

The present study tested the hypothesis that a formula with a macronutrient composition lower than conventional formula given for the first week of life would lead to slower weight gain. The study aimed to assess both the tolerance of this new formula and its effects on patterns of early growth. The principal efficacy outcome was the rate of weight gain from 1-7 days of age with the expectation that babies randomized to the lower nutrient formula would have a slower rate of weight gain—more like a breast-fed baby. An appraisal of the published data (see tables in the study protocol) from breast-fed infants suggests that colostrum has slightly higher protein content when compared to formula (2-3 g/100 ml in colostrum in the first week compared to 1.5-2.0 g/100 ml for formula-milk). However, early breast milk differs markedly in energy density (estimated at 44 kcal/100 ml for colostrum compared to 67 kcal/100 ml for formula). For the supply of energy in the first week, there are large differences in both carbohydrate content (2-3 g/100 ml in very early breast milk compared to 7 g/100 ml in formula) and lipid content (2 g/100 ml in colostrum compared to approximately 4 g/100 ml in formula). These differences in macronutrient composition remain in the second week of life, albeit to a lesser extent.

The present study used a formula modified to more closely resemble the energy density of breast-milk in the first postnatal week. There were two versions of the modified formula—one for postnatal days 1 and 2 (with 22 kcal/100 ml of energy and 0.7 g/100 ml protein) and the other for postnatal days 3-7 (44 kcal/100 ml of energy with 1.4 g/100 ml of protein). The nutritional composition of the study formula in comparison to early breast-milk and standard term formula is given in Table 6 along with the European Union guidelines for composition of infant formula (for both the upper and lower limits according to energy density). After 7 days all formula-fed infants were given a standard formula (i.e. Similac Advance).

Methods

Participants

Mothers whose babies were likely to stay in hospital for at least 2 days were recruited by research nurses in two participating hospitals (University College, London and the Wishaw Hospital, Lanarckshire). Inclusion criteria were birth weight greater than the $10^{th}$ centile for weight for gestational age and sex; gestation≥37 weeks and living within a defined geographical boundary (to enhance efficiency of follow-up). Exclusion criteria included multiple births, major congenital disease, illness or social problems in mother or baby, temporary residents or those likely to leave the area. The study was approved by National and Local Research Ethical Committees.

Infants of mothers who unequivocally wished to formula feed were randomized to one of the two feeding regimes as soon as possible but within the first 12 hours after birth (infants were allowed to feed ad libitum before randomization). Formula-fed infants were randomized to a conventional (control) formula or to a modified formula that more closely resembled the energy density and nutrient composition of breast-milk in the first postnatal week. There were two versions of the modified formula—one for postnatal days 1 and 2 and the other for postnatal days 3-7. The nutritional composition of the study formula in comparison to early breast-milk and standard term formula is given in Table 6a. Table 6b has the composition of the study formula in comparison with the European Union guidelines for composition of infant formula (for both the upper and lower limits according to energy density). Formula was delivered in ready to feed bottles and mothers were advised to feed the infants ad libitum. After 7 days all formula-fed infants were given a standard formula (Similac Advance) until 28 days of age. Infants of mothers who decided to breast-feed and met the inclusion criteria were recruited into the breast-feeding arm of the study. Once randomized, all infants were followed to the study endpoint of 28 days irrespective of whether they continued with or changed their original feeding choice (thereby allowing an intention to treat analysis). Sample size for this pilot study was 25 infants in each of three dietary groups (25 breast-fed, 25 fed low nutrient formula, 25 given standard formula).

Measurements

Daily anthropometric measurements were made using standard protocols and equipment for the first seven days and again on days 14 and 28 days of age. Further follow-up at age 6 months was added as an amendment to the original study protocol. Body composition was determined on days 1, 7, 14 and 28 using skinfold measurement and from the dilution of deuterium. Demographic obstetric and socio-economic information was collected at randomization. The volume of formula intake was determined by asking mothers to keep any milk not drunk from ready to feed bottles in a sealed container provided. This was then collected by the research nurse and the volume of formula intake estimated by difference in weight.

Physiological Monitoring

A random urine sample for ketone analysis was collected daily for the first 3 days. Blood was also obtained by a heel prick to measure pre-feed blood glucose concentration on two occasions during the first three days. A stool sample was also collected at 1, 3 and 7 days of age, and kept for biochemical analysis (e.g., of fat content) and microbiological analysis (e.g., of stool flora). Some infants also had a blood sample at 1 week of age. Two questionnaires (at age 2 and 5 days) were used to assess the tolerance and feeding behaviors in formula fed infants.

Statistical Analysis

Anthropometric variables at birth (head circumference, weight and length) were compared to the general population by calculating z scores based on UK reference data.

The distributions of skinfolds were not normal and so were loge transformed and then multiplied by 100 prior to statistical analyses. Therefore standard deviation for 100 loge transformed data represents the coefficient of variation, while regression coefficients represent the percentage difference in fat mass indices per unit change in independent variable (42). Comparisons between (randomized) groups were made with Student's t-test for continuous variables and Chi-squared for categorical variables. Initial analyses were on an intention to treat basis. Multiple regression analysis was then used to assess differences between randomized groups after adjustment for birth weight z score and sex (factors known to affect post-natal weight gain). In a secondary analysis, breast-fed infants were compared with the two formula-fed groups using one-way analysis of variance and Bonferroni corrections. Statistical analyses were conducted using SPSS for windows (version 15.0; SPSS Inc, Chicago).

Results

Main Effect: Comparison of Groups Randomly Assigned to Different Formulas

Infants were closely matched at birth for demographic and anthropometric factors. By chance, infants randomized to the lower-nutrient formula were on average born 5 days earlier and hence were smaller (for weight, length and head circumference) than those given control formula. However there were no statistical differences between randomized formula-fed groups in z scores for weight, length or head circumference.

Weight gain in the first seven days (primary outcome) in infants receiving the low nutrient formula was lower than in controls (mean difference: −104 g; 95% CI of difference −204 to −4 g; p=0.04). However, length gain or head growth did not differ between randomized formula-fed groups.

Infants given the lower nutrient formula were lighter than controls when assessed beyond the period of dietary intervention at age 28 days (mean difference in weight at age 28 days: −434 g; 95% CI: −709 to −160 g; p=0.003). This difference remained significant after adjustment for birth weight z score and sex (mean difference: −366 g; 95% CI: −562 to −170; p=0.0005). Similarly, skinfold thickness was also lower in infants given the lower nutrient formula compared to controls after adjustment for birth weight z score and sex (mean difference: −11.6%; 95% CI: −22.8% to −0.4%; p=0.04). In contrast, at the primary study end point of 28 days, there was no effect of infant diet on head circumference or length even after adjustment for birth weight z score and sex (p>0.1 for both length and head circumference) (data not presented).

Weight at 6 months of age was lower in infants fed the lower nutrient formula versus the standard, but did not differ from those given breast-milk. This difference in weight remained significant after adjustment for birth weight z score and sex (mean difference: −478 g lower weight in infants given the lower nutrient formula; 95% confidence intervals −915 to −42 g) (p=0.03) However, there were no differences in formula-fed infants in length or head circumference. The pattern of weight gain for girls given standard or low nutrient formula is given in FIG. 1.

Safety Tolerance Data

Randomized formula fed groups did not differ in the main safety outcome (risk of hypoglycemia) as assessed by the presence of ketones in the urine or the blood glucose concentration. In fact the minimum value for blood glucose recorded in formula-fed infants was 2.1 mmol/L.

The new formula appeared to be well tolerated based on questionnaires conducted on the second and fifth days. On day 2 there were no statistically significant differences in the number of babies who had a problem with the formula, fussed or resisted the bottle, disliked the formula, or had problems with too frequent bowel movements, hard stools, color or consistency of stools, spitting up feeds, vomiting after feeds, or not drinking the formula in a reasonable time (data not presented). Mothers also did not perceive problems with the odor of the formula or of babies' stools (data not presented). In fact 17/29 (59%) of infants were perceived to be doing very well on the control formula compared to 16/31 (51%) of infants on the low-nutrient formula (p=0.8). As expected, more infants fed the control formula (64%) always appeared to be have their hunger satisfied compared to those given the lower nutrient formula (34%) (p=0.02).

On day 5, there were no statistically significant differences between formula-fed infants in the number of babies who had a problem with the formula, were satisfied after a feed, or liked the formula (data not presented). Similarly, there was no statistical difference in the number of mothers who were concerned about the consistency of the formula, or who would continue with the assigned formulas (82% in mothers given the low-nutrient formula and 81% in the control group) (other data not presented).

Volumes of Intake

The volume of milk intake on days 1, 2, 3, 4, 5, 6, 13, and 27 of age did not differ between randomized formula-fed infants (data not presented). The volume of intake over days 1 and 2 combined (mean of 640 mls) in control formula fed babies was similar to those given the low nutrient formula (mean of 600 mls) (p=0.5). As a result of similar volumes of intake, the estimated energy and protein intakes of infants fed the lower-nutrient formula were lower than those given the standard formula and more similar to the intakes of breast-fed children (the latter were calculated using the average intake and composition of breast-fed infants). The mean protein and energy intake of the three dietary groups are shown graphically in FIGS. 2a and 2b.

Comparison of Three Dietary Groups

Analysis of variance was used to compare anthropometric variables in the three dietary groups. At birth, breast-fed infants were heavier than those fed control formula and, as expected, had better educated mothers than infants formula-fed. However, there were no other statistically significant differences between the three dietary groups at baseline (randomization). Weight gain in the first week of life was significantly lower than in infants fed control formula (p=0.001), but did not differ from infants fed the new lower-nutrient formula (p=0.6). There were no other statistically significant differences in any anthropometric measure at follow-up between infants breast-fed and those given control or lower-nutrient formula.

Non-Randomized Analyses

We tested the hypothesis that faster weight gain in the first week was associated with greater weight independent of length at age 6 months. In both formula fed infants and the population as a whole greater weight gain in the first week was associated with greater weight at age 6 months independent of length at age 6 months, birth weight z score and sex (in formula fed infants every 100 g increase in weight in the first week was associated with a 143 g greater weight at age 6 months; 95% CI 47 g to 239 g; p=0.005); (in the whole population: every 100 g increase in weight in the first week was associated with 190 g increase in weight at age 6 months; 95% CI 102 g to 278 g; p=0.00005).

TABLE 1

Some Characteristics of Children Born Preterm who were Followed-up and not Followed-up in Adolescence[1]

| | Trial 1: Preterm Formula versus Banked Breast Milk | | | | Trial 2: Preterm Formula versus Term Formula | | | |
|---|---|---|---|---|---|---|---|---|
| | Followed-up (n = 130)[2] | | Not Followed-up (n = 372) | | Followed-up (n = 86) | | Not Followed-up (n = 338) | |
| Variable | Mean | SD | Mean | SD | Mean | SD | Mean | SD |
| Growth | | | | | | | | |
| Birth weight (kg) | 1.4 | 0.3 | 1.4 | 0.3 | 1.4 | 0.3 | 1.4 | 0.3 |
| (range) | (0.7 to 1.8) | | (0.6 to 1.8) | | (0.7 to 1.8) | | (0.5 to 1.8) | |
| Gestation (weeks) | 31.1 | 2.6 | 30.7 | 2.9 | 30.7 | 2.8 | 30.8 | 2.9 |
| (range) | (26 to 38) | | (25 to 39) | | (26 to 37) | | (24 to 39) | |
| Birth weight z score | −1.0 | 1.2 | −0.7 | 1.3 | −0.8 | 1.1 | −0.7 | 1.3 |
| Discharge weight z score | −2.1 | 1.0 | −2.0 | 1.1 | −2.1 | 1.0 | −2.1 | 1.0 |
| Demographic/clinical | | | | | | | | |
| Social class | 3.4 | 1.5 | 3.6 | 1.9 | 3.5 | 1.6 | 3.8 | 1.8 |
| No. (%) non-manual[3] | 53 (41) | | 111 (30)[4] | | 35 (40) | | 97 (29)[4] | |
| Apgar at 5 minutes of age | 8.3 | 1.7 | 8.0 | 1.9 | 7.8 | 1.8 | 8.0 | 2.0 |
| Days ventilation[5] | 0 | 0-4 | 1 | 0-5 | 1 | 0-4 | 1 | 0-6 |
| Days in >30% oxygen[5] | 2 | 0-7 | 4 | 1-8 | 2 | 0-16 | 3 | 0-10 |

[1]The total number of subjects was 926.
[2]Slight loss of n for some variables.
[3]Analysed by Chi-squared;
[4]p = 0.02;
[5]Median, inter-quartile range, analysed by Mann-Whitney. There were no significant differences between groups in either trial expect for the percentage from a manual versus non-manual social class.

TABLE 1a

Some Subject Characteristics

| | | | Preterm Subjects with Early Weight Gain[1] | |
|---|---|---|---|---|
| | Term Controls (n = 61) | Preterm (n = 216) | On or below median (102) | Above median (101) |
| At Follow-up | | | | |
| Sex: Male (%) | 29 (47) | 97 (45) | 49 (48) | 40 (40) |
| Age (years) | 14.7  0.8 | 15.0  0.9 | 15.0  0.9 | 15.1  0.9 |
| BMI (kg/m²) | 21.6  4.1 | 21.2  3.7 | 21.0  3.2 | 21.3  3.7 |
| Social code | 3.3  1.5 | 3.2  1.3 | 3.3  1.3 | 3.2  1.4 |
| Neonatal | | | | |
| Birth weight (kg) | 3.5  0.6 | 1.4  0.3 | 1.3  0.3 | 1.4  0.3 |
| Gestation (weeks) | 40.0  1.2 | 31.0  2.7 | 30.0  2.2 | 32.0  2.6 |
| Z score birth weight | 0.04  0.8 | −0.9  1.2 | −0.3  0.9 | −1.5  1.0 |
| Z score discharge weight | — — | −2.1  0.9 | −2.0  0.9 | −2.2  0.9 |
| Days ventilation[2] | — — | 0.0  4.0 | 3.0  7.0 | 0.0  1.0 |
| Days in 30% $O_2$[2] | — — | 2.0  8.0 | 6.0  16.0 | 1.0  2.0 |
| Neonatal Growth | | | | |
| Weight change: | | | | |
| 0-2 wk (g)[3] | — — | −41.5  102.6 | −121.9  56.1 | 39.8  69.2 |
| Minimum-2 wk (g)[1] | — — | 97.6  52.5 | 68.5  32.7 | 127.0  52.4 |
| Change in weight z score between: | | | | |
| 1. Birth and discharge | — — | −1.2  0.8 | −1.7  0.7 | −0.7  0.5 |
| 2. Birth and 2 weeks | — — | −1.0  0.5 | −1.4  2.9 | −0.7  2.8 |

TABLE 1a-continued

Some Subject Characteristics

|  | Term Controls (n = 61) | | Preterm (n = 216) | | Preterm Subjects with Early Weight Gain[1] | | | |
|---|---|---|---|---|---|---|---|---|
|  | | | | | On or below median (102) | | Above median (101) | |
| Endothelial Function | | | | | | | | |
| Arterial Diameter | 3.7 | 0.6 | 3.5 | 0.5 | 3.5 | 0.5 | 3.5 | 0.5 |
| FMD %[4] | 6.1 | 2.8 | 6.6 | 3.3 | 7.4 | 3.4 | 5.8 | 2.9 |
| Reactive Hyperaemia (%) | 683 | 362 | 682 | 314 | 651 | 295 | 691 | 325 |

[1]Preterm subjects with weight gain in the first 2 postnatal weeks above and below the median for the population;
[2]Median and inter-quartile range;
[3]Weight change (g) = mean weight in second week minus birth weight (or minimum weight);
[4]FMD % = (Change in arterial diameter/pre-hyperaemic diameter) × 100.

TABLE 2

Regression Analyses of Endothelial Function in 216* Subjects (post-hyperaemic change in brachial artery diameter) (mm)

| Variable | Unadjusted | | | Adjusted[1] | | |
|---|---|---|---|---|---|---|
|  | Regression Coefficient (mm) | 95% CI | p | Regression Coefficient (mm) | 95% CI | p |
| Birth weight z score | 0.013 | 0.001 to 0.026 | 0.035 | 0.016 | 0.002 to 0.029 | 0.021 |
| Change in weight z score between: | | | | | | |
| 1. Birth and discharge | −0.026 | −0.046 to −0.007 | 0.007 | −0.030 | −0.055 to −0.006 | 0.016 |
| Birth and 4 weeks | −0.037 | −0.066 to −0.008 | 0.012 | −0.035 | −0.068 to −0.002 | 0.037 |
| Birth and 2 weeks | −0.057 | −0.087 to −0.024 | 0.001 | −0.062 | −0.096 to −0.028 | <0.001 |
| 2. 2 weeks and discharge | −0.025 | −0.056 to 0.005 | 0.10 | −0.013 | −0.052 to 0.026 | 0.52 |
| 3. Discharge and 18 months | 0.006 | −0.006 to 0.018 | 0.34 | 0.007 | −0.007 to 0.021 | 0.35 |
| 4. 18 months and 9-12 years | −0.005 | −0.019 to 0.008 | 0.46 | −0.009 | −0.023 to 0.006 | 0.27 |
| 5. 9-12 years and 13-16 years | −0.003 | −0.027 to 0.022 | 0.82 | −0.007 | −0.034 to 0.019 | 0.57 |
| [2]Weight change between | | | | | | |
| 1. Birth and $2^{nd}$ week (100 g) | −0.026 | −0.040 to −0.012 | <0.001 | −0.024 | −0.043 to −0.006 | 0.009 |
| 2. Minimum weight and $2^{nd}$ week (100 g) | −0.037 | −0.065 to −0.009 | 0.010 | −0.035 | −0.069 to 0.000 | 0.050 |
| [2]Length change between birth and $2^{nd}$ week (cm)[3] | −0.002 | −0.004 to 0.000 | 0.03 | −0.002 | −0.004 to 0.000 | 0.041 |

Each line represents a separate regression model. All analyses adjusted for pre-hyperaemic brachial artery diameter.
*Slight loss of n in some models.
[1]Adjusted for: age, sex, height, weight, fasting serum LDL cholesterol concentrations, room temperature, social class, and indices of neonatal morbidity (number of days of ventilation or days in >30% oxygen).
[2]Adjusted for confounding variables (as above) and birth weight and gestation.
[3]n = 100

TABLE 3

Comparison of Subject Characteristics of Infants born Preterm and Randomised to Different Diets at Birth

|  | Trial 1 & 2 Combined Preterm Formula Vs 'Lower Nutrient' Diet[1] | | | | Trial 1 Preterm Formula Vs Banked Breast Milk | | | | Trial 2 Preterm Formula Vs Term Formula | | | |
|---|---|---|---|---|---|---|---|---|---|---|---|---|
|  | (n = 106) | | (n = 110) | | (n = 64) | | (n = 66) | | (n = 42) | | (n = 44) | |
| Variable | Mean | SD | Mean | SD | Mean | SD | Mean | SD | Mean | SD | Mean | SD |
| Sex: No. males (%)[2] | 45 (42) | | 52 (57) | | 32 (50) | | 32 (49) | | 13 (31) | | 20 (45) | |
| Age (years) | 15.0 | 0.9 | 15.0 | 0.9 | 15.1 | 1.0 | 15.2 | 0.9 | 14.8 | 0.8 | 14.8 | 0.8 |
| Weight (kg) | 55.0 | 11.3 | 55.8 | 10.0 | 55.0 | 12.2 | 53.9 | 9.9 | 54.9 | 10.1 | 58.6 | 9.7 |
| Height (cm) | 161.2 | 8.6 | 161.8 | 9.7 | 160.8 | 9.4 | 161.3 | 10.2 | 161.9 | 7.3 | 162.5 | 8.9 |
| Body mass index (kg/m$^2$) | 21.0 | 3.6 | 21.3 | 3.8 | 21.1 | 3.9 | 20.8 | 3.9 | 20.9 | 3.2 | 22.2 | 3.5 |
| Sum of skinfolds (mm)[3] | 52 | 30-74 | 50 | 34-71 | 52 | 30-77 | 44 | 30-62 | 52 | 31-73 | 57 | 47-78 |
| Neonatal | | | | | | | | | | | | |
| Social class | 3.4 | 1.4 | 3.5 | 1.7 | 3.5 | 1.3 | 3.4 | 1.7 | 3.4 | 1.7 | 3.6 | 1.6 |
| No. (%) non-manual[2] | 43 (41) | | 45 (41) | | 25 (39) | | 28 (42) | | 18 (43) | | 17 (39) | |
| Birth weight (kg) | 1.4 | 0.3 | 1.4 | 0.3 | 1.3 | 0.3 | 1.4 | 0.3 | 1.4 | 0.4 | 1.3 | 0.3 |
| Gestation (weeks) | 31.1 | 2.7 | 30.9 | 2.7 | 31.2 | 2.6 | 31.1 | 2.5 | 30.9 | 2.8 | 30.6 | 2.9 |

TABLE 3-continued

Comparison of Subject Characteristics of Infants born Preterm and Randomised to Different Diets at Birth

|  | Trial 1 & 2 Combined Preterm Formula Vs 'Lower Nutrient' Diet[1] | | | | Trial 1 Preterm Formula Vs Banked Breast Milk | | | | Trial 2 Preterm Formula Vs Term Formula | | | |
|---|---|---|---|---|---|---|---|---|---|---|---|---|
|  | (n = 106) | | (n = 110) | | (n = 64) | | (n = 66) | | (n = 42) | | (n = 44) | |
| Variable | Mean | SD | Mean | SD | Mean | SD | Mean | SD | Mean | SD | Mean | SD |
| Apgar at 5 minutes of age | 8.3 | 1.8 | 7.9 | 1.8 | 8.4 | 1.9 | 8.2 | 1.6 | 8.2 | 1.5 | 7.5 | 1.9 |
| Days in >30% Oxygen[3] | 2 | 0-9 | 3 | 0-7 | 3 | 0-7 | 2 | 0-7 | 2 | 0-17 | 4 | 0-15 |
| Days of ventilation[3] | 0 | 0-4 | 0 | 0-4 | 0 | 0-4 | 0 | 0-3 | 1 | 0-4 | 1 | 0-4 |
| z score birth weight | −0.9 | 1.2 | −0.8 | 1.2 | −1.1 | 1.2 | −0.8 | 1.2 | −0.7 | 1.1 | −0.8 | 1.1 |
| z score discharge weight | −1.9 | 1.0 | −2.2 | 0.9* | −2.0 | 1.0 | −2.1 | 1.0 | −1.8 | 0.9 | −2.3 | 0.8* |
| Growth Change in weight z score between: | | | | | | | | | | | | |
| Birth and discharge | −1.0 | 0.7 | −1.4 | 0.7*** | −0.9 | 0.7 | −1.3 | 0.6** | −1.1 | 0.8 | −1.5 | 0.8* |
| Birth and 2 weeks | −1.0 | 0.5 | −1.1 | 0.4** | −0.9 | 0.5 | −1.1 | 0.4* | −1.0 | 0.5 | −1.2 | 0.5 |
| 2 weeks and discharge | −0.01 | 0.5 | −0.3 | 0.5*** | 0.05 | 0.5 | −0.2 | 0.4** | −0.1 | 0.5 | −0.4 | 0.5* |
| Weight change between | | | | | | | | | | | | |
| Birth and 2nd week (g) | −18.4 | 108.2 | −62.6 | 92.7** | −12.5 | 115.2 | −57.9 | 86.0* | −27.1 | 97.8 | −70.0 | 103.2 |
| Minimum weight and 2nd week (g) | 109.50 | 57.8 | 86.7 | 44.6** | 113.7 | 60.6 | 96.2 | 41.8 | 103.3 | 53.7 | 71.6 | 45.3** |

[1]Lower nutrient diet = banked breast milk or standard term formula;
[2]Chi-squared analysis;
[3]Median, inter-quartile range, analysed by Mann-Whitney;
*$p < 0.05$;
**$p < 0.01$;
***$p < 0.001$

TABLE 4

Early Diet and Fasting Proinsulin, Insulin and Glucose Concentrations in Adolescents born Preterm

|  | Randomised Diets | | | | | | | |
|---|---|---|---|---|---|---|---|---|
| Variable | n[1] | Geometric Mean | CV (%) | n | Geometric Mean | CV (%) | Mean Difference (%) | 95% CI of Difference (%) | p-value |
| Trials 1 & 2 combined | 106 | Preterm Formula | | 110 | Lower Nutrient Diet[2] | | | | |
| 32-33 Split proinsulin (pmol/L) | | 7.2 | 56 | | 5.9 | 55 | 20.6 | 5.0 to 36.3 | 0.01 |
| Proinsulin (pmol/L) | | 4.3 | 49 | | 4.1 | 47 | 6.4 | −7.2 to 20.0 | 0.4 |
| Insulin (pmol/L) | | 45.8 | 55 | | 44.8 | 60 | 2.0 | −14.2 to 18.1 | 0.8 |
| Glucose (mmol/L)[3] | | 4.7 | 0.5 | | 4.7 | 0.6 | 0.08 | −0.07 to 0.2 | 0.3 |
| Trial 1 | 64 | Preterm Formula | | 66 | Banked Breast Milk | | | | |
| 32-33 Split proinsulin (pmol/L) | | 6.8 | 56 | | 5.7 | 57 | 18.7 | −1.7 to 39.0 | 0.07 |
| Proinsulin (pmol/L) | | 4.3 | 52 | | 4.3 | 49 | 0.3 | −17.8 to 18.5 | 0.9 |
| Insulin (pmol/L) | | 42.4 | 57 | | 42.5 | 67 | −0.3 | −22.6 to 22.0 | 0.9 |
| Glucose (mmol/L)[3] | | 4.7 | 0.5 | | 4.7 | 0.4 | 0.02 | −0.1 to 0.2 | 0.8 |
| Trial 2 | 42 | Preterm Formula | | 44 | Term Formula | | | | |
| 32-33 Split proinsulin (pmol/L) | | 7.8 | 56 | | 6.2 | 52 | 23.1 | −1.8 to 48.0 | 0.07 |
| Proinsulin (pmol/L) | | 4.3 | 46 | | 3.7 | 42 | 16.7 | −3.7 to 37.2 | 0.1 |
| Insulin (pmol/L) | | 51.8 | 50 | | 49.4 | 43 | 4.7 | −16.9 to 26.2 | 0.7 |
| Glucose (mmol/L)[3] | | 4.8 | 0.5 | | 4.6 | 0.8 | 0.2 | −0.1 to 0.5 | 0.2 |

[1]Some loss of n for some comparisons between randomised groups;
[2]Lower nutrient diet = banked breast milk or standard term formula;
[3]arithmetic mean and standard deviation.
All values are unadjusted.

TABLE 5

Regression Analyses of Early Growth and Later Proinsulin Concentrations in Adolescents born Preterm

|  | Unadjusted | | | Adjusted[1] | | |
|---|---|---|---|---|---|---|
| Variable | Regression Coefficient (%) | 95% CI (%) | p | Regression Coefficient (%) | 95% CI (%) | p |
| 32-33 Split Proinsulin | | | | | | |
| Birth weight z score | −5.9 | −12.6 to 0.7 | 0.08 | −4.9 | −11.3 to 1.5 | 0.1 |

TABLE 5-continued

Regression Analyses of Early Growth and Later Proinsulin Concentrations in Adolescents born Preterm

| Variable | Unadjusted | | | Adjusted[1] | | |
|---|---|---|---|---|---|---|
| | Regression Coefficient (%) | 95% CI (%) | p | Regression Coefficient (%) | 95% CI (%) | p |
| Change in weight z score between[2] | | | | | | |
| Birth and discharge | 13.6 | 3.2 to 24.1 | 0.01 | 21.1 | 5.8 to 36.4 | 0.007 |
| Birth and 2 weeks | 26.7 | 9.5 to 43.9 | 0.003 | 44.0 | 18.4 to 69.6 | 0.0009 |
| 2 weeks and discharge | 8.4 | −8.6 to 25.4 | 0.3 | 8.6 | −11.7 to 28.8 | 0.4 |
| Weight change between[2] | | | | | | |
| 1. Birth and 2$^{nd}$ week (per 100 g) | 13.2 | 5.4 to 20.9 | 0.001 | 15.6 | 6.3 to 24.8 | 0.001 |
| 2. Minimum weight and 2$^{nd}$ week (per 100 g) | 19.0 | 3.3 to 34.8 | 0.02 | 22.9 | 5.4 to 40.4 | 0.01 |
| Proinsulin | | | | | | |
| Birth weight z score | −7.2 | −12.9 to −1.6 | 0.01 | −5.9 | −11.5 to −0.2 | 0.04 |
| Change in weight z score between[2] | | | | | | |
| Birth and discharge | 16.0 | 7.1 to 24.8 | 0.0005 | 14.9 | 1.5 to 28.2 | 0.03 |
| Birth and 2 weeks | 31.2 | 16.9 to 45.5 | <0.0001 | 37.3 | 15.4 to 59.1 | 0.0009 |
| 2 weeks and discharge | 11.0 | −3.5 to 25.4 | 0.1 | 2.3 | −15.0 to 19.5 | 0.8 |
| Weight change between[2] | | | | | | |
| 1. Birth and 2$^{nd}$ week (per 100 g) | 15.1 | 8.7 to 21.5 | <0.0001 | 14.9 | 7.1 to 22.7 | <0.0002 |
| 2. Minimum weight and 2$^{nd}$ week (per 100 g) | 28.6 | 15.5 to 4.2 | <0.0001 | 24.5 | 9.6 to 39.4 | 0.001 |

Each line represents a separate regression model.
[1]Adjusted for: age, sex, current body mass index z score, social class, indices of neonatal morbidity (number of days of ventilation or days in >30% oxygen).
[2]Adjusted for confounding factors (as above) together with birth weight and gestation. Small loss of n in some models.

TABLE 6a

COMPOSITION OF CLINICAL STUDY FORMULA, TERM INFANT FORMULA, AND EARLY HUMAN MILK

| Nutrient | Unit (per dL or 100 mL) | Clinical study formula | Commercially available term infant formula[1] | Early human milk (days 1-5 lactation) | Mature human milk (days 14+ lactation) |
|---|---|---|---|---|---|
| Energy | kcal | 44.1 | 67.6 | 25-50 | 68.0 |
| Volume | mL | 100 | 100 | 100 | 100 |
| Protein | g | 1.3 | 1.4 | 1.2-6.5 | 1.05 |
| Fat | g | 2.06 | 3.65 | 1.0-2.8 | 3.91 |
| Carbohydrate | g | 4.64 | 7.3 | 1.9-6.4 | 7.2 |

TABLE 6b

COMPOSITION OF CLINICAL STUDY FORMULA, TERM INFANT FORMULA, AND EARLY HUMAN MILK

| | Content per 100 mL | | | | | |
|---|---|---|---|---|---|---|
| Nutrient | Clinical study formula | Early human milk (days 1-5 lactation) | Mature human milk (days 14+ lactation) | European Union Guidelines per 100 mL | | |
| | | | | Minimum | Maximum | Minimum | Maximum |
| Energy | 44.1 | 25-50 | 68.0 | 60.0 | 60.0 | 70.0 | 70.0 |
| Protein | 1.3 | 1.2-6.5 | 1.05 | 1.08 | 1.8 | 1.26 | 2.1 |
| Fat | 2.06 | 1.0-2.8 | 3.91 | 2.64 | 3.9 | 3.08 | 4.55 |
| Carbohydrate | 4.64 | 1.9-6.4 | 7.2 | 5.4 | 8.4 | 6.3 | 9.8 |

The invention claimed is:

1. A method for reducing the extent of or occurrence of adverse health effects later in life in humans, the method comprising administering to a human who is less than three months of age, a volume of from about 100 ml/day to about 1100 ml/day of a formula containing not more than 1 gram of protein per 100 ml of formula, not more than 50 kcal per 100 ml of formula, or both, wherein about 100 ml/day of the formula is administered to a human who is in the first day of life, from about 200 ml to about 700 ml/day of the formula is administered to a human who has passed the first day of life but who has not passed day 14 of life, and from about 600 ml to about 1100 ml/day of formula is administered to a human who has passed the 14th day of life but is less than three months of age.

2. The method of claim 1, wherein the formula is administered on a daily basis to a human from the first day of life until the human is no longer less than three months of age.

3. The method of claim 1, wherein the formula is administered on a daily basis to a human from the first day of life until the human has passed the 14th day of life.

4. The method of claim 1, wherein the adverse health effects comprise adverse vascular effects.

5. The method of claim 4, wherein the adverse vascular effects comprise atherosclerosis.

6. The method of claim 1, wherein the adverse health effects comprise propensity to insulin resistance and non-insulin dependent diabetes mellitus (Type II diabetes).

7. The method of claim 1, wherein the adverse health effects comprise propensity to obesity.

8. The method of claim 1, wherein the human has a reduced extent of or occurrence of adverse health effects about sixteen years after the formula is administered.

9. The method of claim 1, wherein the human has a reduced extent of or occurrence of adverse health effects at about six months of age.

10. The method of claim 1, wherein the formula is administered to a human who is born preterm.

11. The method of claim 1, wherein the formula is administered to a human who is born full term.

12. The method of claim 1, wherein the formula comprises not more than 1 gram of protein per 100 ml of formula and not more than 50 kcal per 100 ml of formula.

13. The method of claim 1, wherein the formula is administered by infant formula bottles containing, on average, about 150 ml/day to about 900 ml/day of formula for a human who has not passed day 14 of life, and infant formula bottles containing, on average, from about 300 ml/day to about 1200 ml/day of formula for a human who has passed the 14th day of life but is less than three months of age.

* * * * *